United States Patent [19]
Ushio et al.

[11] Patent Number: 4,817,578
[45] Date of Patent: Apr. 4, 1989

[54] INTERNAL COMBUSTION ENGINE

[75] Inventors: Hideaki Ushio; Tadayoshi Hayashi; Kazuo Shibata; Yoshikazu Fujisawa; Tsunehisa Hata, all of Saitama, Japan

[73] Assignee: Honda Giken Kogyo Kabushiki Kaisha, Tokyo, Japan

[21] Appl. No.: 80,495

[22] Filed: Jul. 31, 1987

[30] Foreign Application Priority Data

| Jul. 31, 1986 | [JP] | Japan | 61-180954 |
| Aug. 1, 1986 | [JP] | Japan | 61-118664[U] |
| Aug. 1, 1986 | [JP] | Japan | 61-181593 |
| Aug. 4, 1986 | [JP] | Japan | 61-183183 |
| Sep. 11, 1986 | [JP] | Japan | 61-214264 |
| Oct. 9, 1986 | [JP] | Japan | 61-240979 |
| Nov. 19, 1986 | [JP] | Japan | 61-176580 |
| Feb. 16, 1987 | [JP] | Japan | 62-31510 |
| Mar. 16, 1987 | [JP] | Japan | 62-37253[U] |
| Apr. 14, 1987 | [JP] | Japan | 62-91437 |
| Apr. 14, 1987 | [JP] | Japan | 62-91438 |

[51] Int. Cl.$^4$ .................... F16J 9/28; F02F 1/18; F02F 5/00
[52] U.S. Cl. .................... 123/668; 123/193 C; 428/614; 277/235 A
[58] Field of Search ............. 123/41.83, 41.84, 193 C, 123/193 CP, 193 P, 668; 92/212, 223, 248, 249; 277/216, 235 A, DIG. 6; 428/608, 610, 614

[56] References Cited

U.S. PATENT DOCUMENTS

| 3,535,093 | 10/1970 | Sara | 428/614 X |
| 3,983,793 | 10/1976 | Beardmore | 92/212 |
| 3,995,538 | 12/1976 | Beardmore et al. | 92/212 |
| 4,223,075 | 9/1980 | Harrigan, Jr. et al. | 428/614 X |
| 4,398,527 | 8/1983 | Rynbrandt | 123/668 |
| 4,444,603 | 4/1984 | Yamatsuta et al. | 428/614 X |
| 4,450,207 | 5/1984 | Donomoto et al. | 428/614 |
| 4,466,399 | 8/1984 | Hinz et al. | 123/668 X |
| 4,579,355 | 4/1986 | Kooroki | 277/235 A X |
| 4,590,132 | 5/1986 | Dohnomoto et al. | 428/614 |
| 4,601,956 | 7/1986 | Dohnomoto | 428/614 |
| 4,612,260 | 9/1986 | Kumagai et al. | 277/235 A X |

FOREIGN PATENT DOCUMENTS 3149775 6/1983 Fed. Rep. of Germany ...... 123/668

Primary Examiner—Willis R. Wolfe
Attorney, Agent, or Firm—Lyon & Lyon

[57] ABSTRACT

An internal combustion engine having a cylinder block made of a light-alloy with a cylinder wall around a cylinder bore including a cylindrical fiber-reinforced portion which is formed of a mixture of an alumina-based fiber and a carbon fiber with a light-alloy matrix. The alumina-based fiber has a fiber volume fraction set in a range of 8 to 20%, and the carbon fiber has a fiber volume fraction set in a range of 0.3 to 15%. The alumina-based fiber contains 25% or less, by weight, of silica, has an average aspect ratio of 20 to 150, and an alpha rate of 2 to 60%. The carbon fiber has an average aspect ratio set in a range of 10 to 100 and a Young's modulus set in a range of 20 to 30 t/mm$^2$. The piston for the cylinder bore has an iron-plated layer covered by a tin-plated layer. The piston rings for the piston may be of austenitic stainless steel to provide thermal expansion characterics similar to the cylinder wall and may be provided with a nitride or chromium-plated layer.

74 Claims, 26 Drawing Sheets

Content of shots having average particle size of 150μm or more (% by weight)

Comparison of average particle size of shots to average diameter of alumina-based fiber

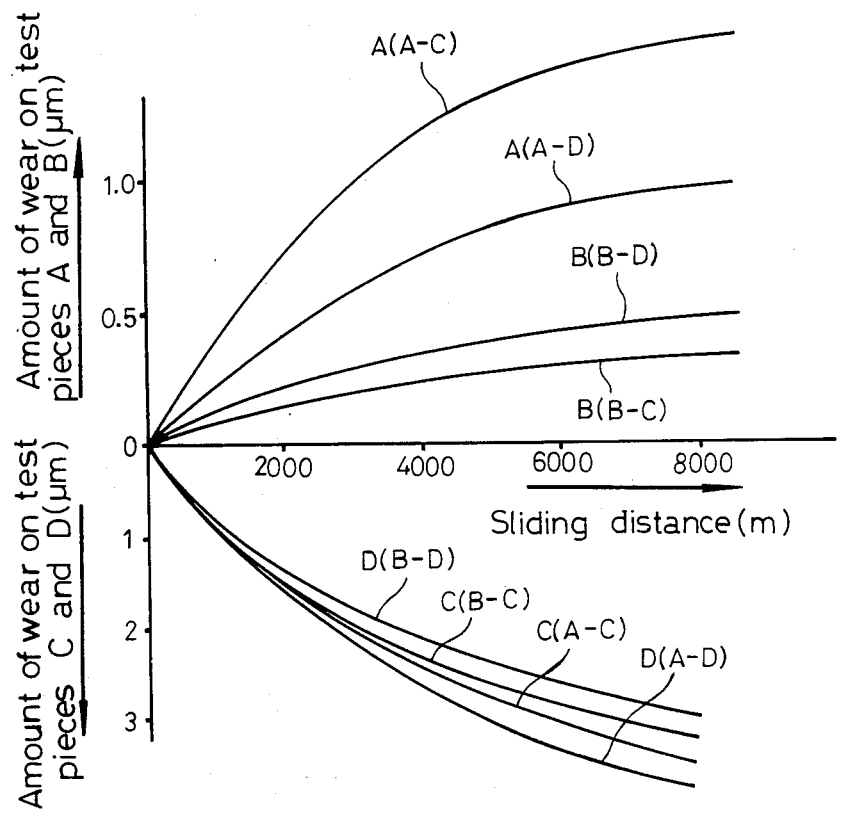

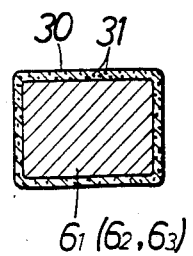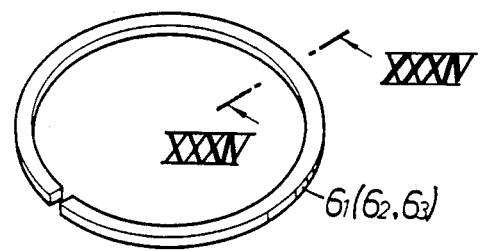

INTERNAL COMBUSTION ENGINE

BACKGROUND OF THE INVENTION

1. Field of the Invention

The present invention relates to an internal combustion engine, and more particularly, to an internal combustion engine comprising a cylinder block made of a light-alloy and having a wall, around the cylinder bore, comprised of a cylindrical fiber-reinforced portion which is formed of a mixture of an alumina-based fiber and a carbon fiber with a light alloy matrix; and a piston having a piston ring mounted thereon and slidably received in the cylinder bore.

2. Description of the Prior Art

There is conventionally known an internal combustion engine wherein a cylinder block includes a cylinder sleeve comprised of an inner shell made of a partially stabilized zirconia and an outer shell made of a gray cast iron, as disclosed in U.S. Pat. No. 4,544,607.

However, this internal combustion engine is not advantageous in providing a decrease in weight, because the outer shell in the cylinder sleeve is made of the cast iron.

Also a construction has been suggested wherein the cylinder block is produced in a casting process by using a light alloy, and the wall of the cylinder bore is comprised of a cylindrical fiber-reinforced portion which is formed of a reinforcing fiber and a light alloy matrix. In this case, however, there have been problems with the strength of the cylindrical fiber-reinforced portion, the sliding characteristics of the mating piston and piston ring with the cylinder, the machinability, and the like.

SUMMARY OF THE INVENTION

It is an object of the present invention to provide an internal combustion engine comprising a cylinder block made of a light-alloy and including a cylindrical fiber-reinforced portion of the type described above, wherein the cylindrical fiber-reinforced portion has improved strength, sliding characteristics and machinability, and the piston and piston ring also have improved sliding characteristics.

To accomplish the above object, according to the present invention, there is provided an internal combustion engine comprising a cylinder block made of a light-alloy and having a wall, around the cylinder bore, comprised of a cylindrical fiber-reinforced portion which is formed of a mixture of an alumina-based fiber has a fiber volume fraction set in a range of 0.3 to 15%, an average aspect ratio set in a range of 10 to 100, and a Young's modulus set in a range of 20 to 30 t/mm².

In addition, according to the present invention, there is provided an internal combustion engine of the type described above, wherein the alumina-based fiber contains silica of a content of 25% by weight or less, an average aspect ratio set in a range of 20 to 150, and an alpha rate set in a range of 2 to 60%.

Further, according to the present invention, there is provided an internal combustion engine of the type described above, wherein the alumina-based fiber contains shots with a content of the entire shots being set in a range of 10% or less by weight, and with the content of the shots having an average particle size of 150 μm or more being set in a range of 2.5% or less by weight, the content of the shots having an average particle size less than 150 μm being set in a range of 4.0% or less by weight, and the content of the shots having an average particle size 50 or more times an average diameter of the alumina-based fiber being set in a range of 4.0% or less by weight, based on the alumina-based fiber containing the shots.

Still further, according to the present invention, there is provided an internal combustion engine of the type described above, wherein an inner peripheral surface of the fiber-reinforced portion has a roughness set at a level equal to or below one half of the average diameter of the alumina-based fiber.

Additionally, according to the present invention, there is provided an internal combustion engine of the type described above, wherein the light alloy is an aluminum alloy containing 1.65 to 14.0% by weight of Si, with a ratio of the amount of Si primary crystal in the fiber-reinforced portion to the amount of Si primary crystal in the light alloy only containing portion being greater than one and less than or equal to 4; and an average particle size of primary crystal Si in the fiber-reinforced portion being set at a level less than the average diameter of the alumina-based fiber.

Still further, according to the present invention, there is provided an internal combustion engine of the type described above, wherein the light alloy is an aluminum alloy containing 14 to 20% by weight of Si.

Still further, according to the present invention, there is provided an internal combustion engine of the type described above, wherein the piston has an iron-plated layer formed on its outer peripheral surface and a tin-plated layer formed on the surface of the iron-plated layer, the iron-plated layer having a hardness of Hv 250 or more and a thickness of 5 to 30 μm, and the tin-plated layer having a thickness of 1 to 10 μm.

Further, according to the present invention, there is provided an internal combustion engine of the type described above, wherein the piston ring is formed of an austenitic stainless steel.

In addition, according to the present invention, there is provided an internal combustion engine of the type described above, wherein the piston ring is formed of an iron-based alloy, with a nitride layer formed on an outer peripheral surface of the piston ring, and the rate of carbonate area occupying the outer peripheral surface being set at 5% or less.

Further, according to the present invention, there is provided an internal combustion engine of the type described above, wherein the piston ring is formed of an iron-based alloy, with a hard chromium-plated layer formed on an outer peripheral surface of the piston ring, the plated layer having a thickness set in a range of 10 to 150 μm and a hardness set in a range of Hv 600 to 1,000.

Further, according to the present invention, there is provided an internal combustion engine of the type described above, wherein the piston ring is formed of an iron-based alloy, with an outer peripheral surface of the piston ring being formed with an iron-plated layer containing hard particles.

Still further, according to the present invention, there is provided an internal combustion engine of the type described above, wherein the piston ring is formed of an iron-based alloy, with an outer peripheral surface of the piston ring being formed with a nickel-based metal-plated layer containing hard particles.

With the above constructions, it is possible to provide an internal combustion engine wherein the cylindrical fiber-reinforced portion provides for fiber-reinforcing abilities such as improvements in scratch critical surface pressure by the alumina-based fiber, seizure critical surface pressure, wear resistance and the like, and also provide for a lubricating ability by the carbon fiber, with an excellent strength, while exhibiting an excellent sliding characteristic even in a non-lubricated condition.

It is also possible to provide an internal combustion engine which includes a high strength cylindrical fiber-reinforced portion formed using a fiber molding which has an excellent shape retention and which is capable of exhibiting a satisfactory fiber reinforcing ability.

In addition, it is possible to provide an internal combustion engine which comprises a cylindrical fiber-reinforced portion having a good cutting property such as machinability.

Further, it is possible to provide an internal combustion engine which comprises a piston including an iron-plated layer having wear resistance and a tin-plated layer formed on a surface of the iron-plated layer and having a lubricatability.

Additionally, it is possible to provide an internal combustion engine wherein forming the piston ring from an austenite-type stainless steel enables a thermal expansion coefficient of the piston ring to approximate that of the aluminum alloy forming the cylinder block, thereby assuring a fitting clearance for the piston ring during a lower temperature to avoid interference of the piston ring with an inner wall of the cylinder bore at the starting of the engine, while suppressing an increase in the fitting clearance for the piston ring during a higher temperature of the engine to provide decreases in the amount of gas blown-by and in the amount of oil consumed.

Further, it is possible to provide an internal combustion engine wherein the outer peripheral surface of the piston ring made of an iron-based alloy has a nitride layer satisfactorily conformable to the cylindrical fiber-reinforced portion, and a rate of carbonate area occupying the outer peripheral surface is specified to provide for a decrease in amount of cylindrical fiber-reinforced portion wear.

Still further, it is possible to provide an internal combustion engine wherein the sliding characteristics between the piston ring and the cylindrical fiber-reinforced portion is improved by forming the hard chromium-plated layer, the iron-plated layer containing the hard particles, or the nickel-plated layer containing the hard particles on the outer peripheral surface of the iron-based alloy piston ring.

The above and other objects, features and advantages of the invention will become apparent from reading of the following detailed description of the preferred embodiment, taken in conjunction with the accompanying drawings.

BRIEF DESCRIPTION OF THE INVENTION

FIG. 32 is a graph illustrating the relationship between sliding distance and amounts of wear on the test pieces;

FIG. 33 is a perspective view of a piston ring;

FIG. 34 is an enlarged sectional view taken along a line XXXIV—XXXIV in FIG. 33;

DESCRIPTION OF THE PREFERRED EMBODIMENTS

Figure 1:
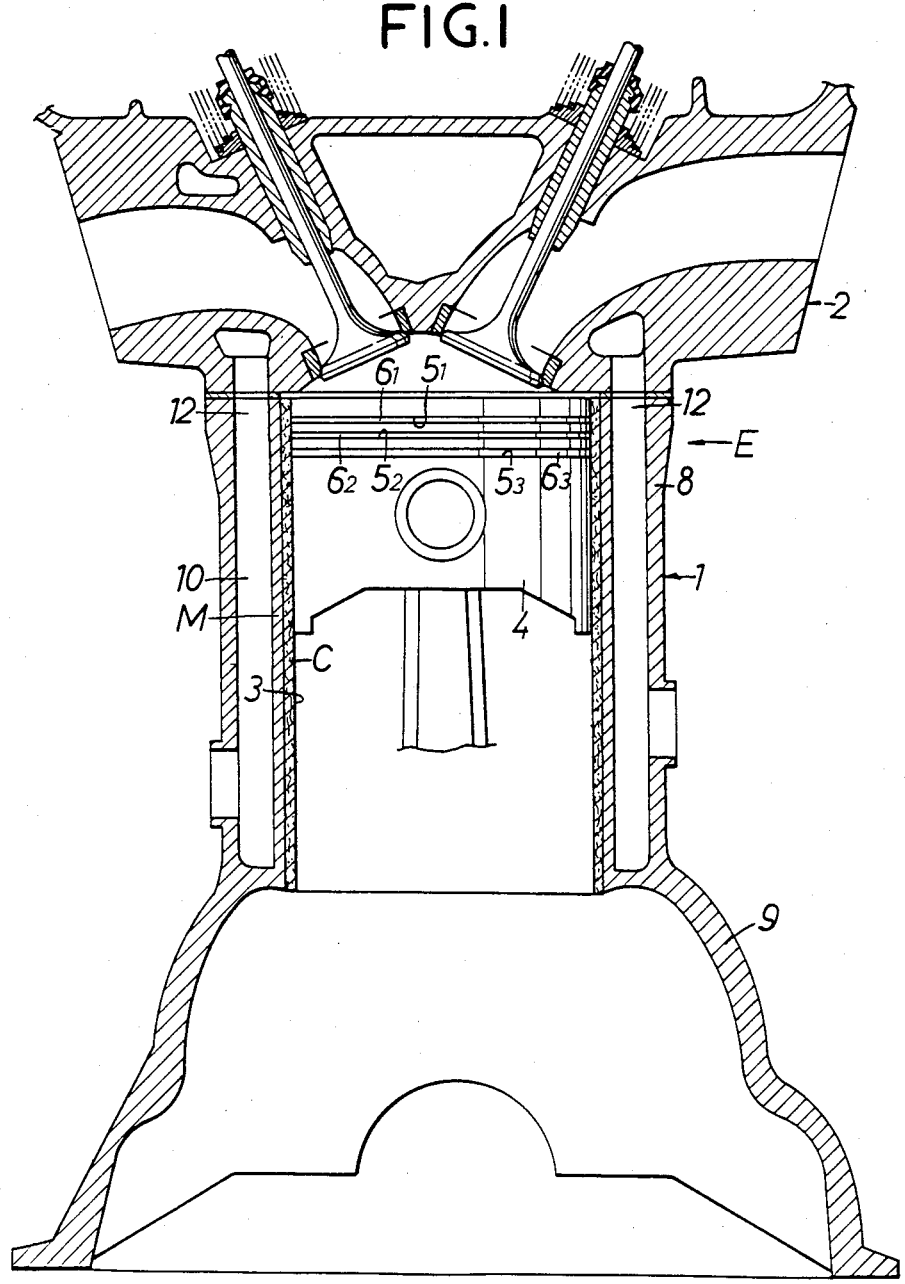
FIG. 1 is a section elevation view, taken substantially on the line I—I in FIG. 3, showing the internal combustion engine employing the present invention.
Figure 2:
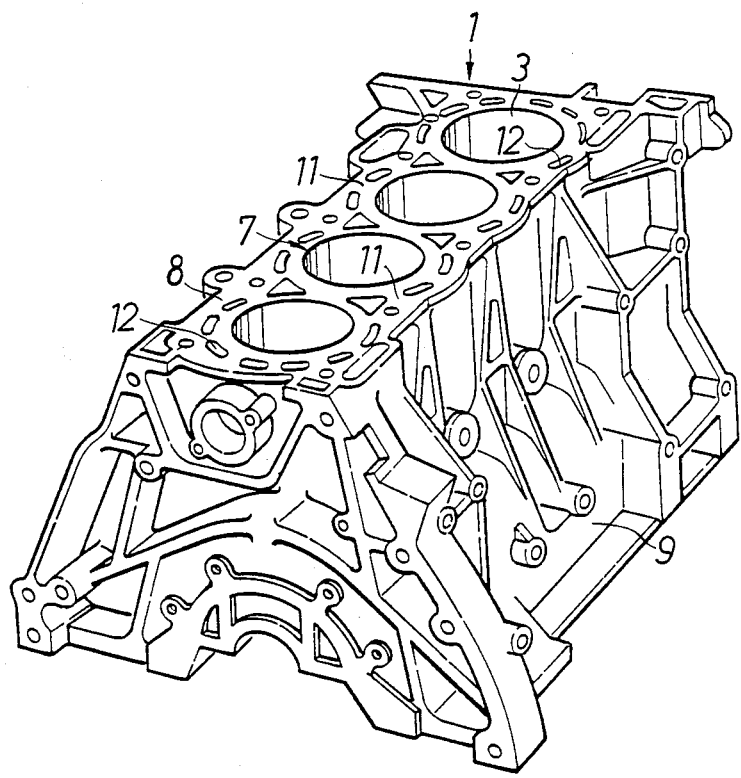
FIG. 2 is a perspective view of the cylinder block of FIG. 1.
Figure 3:
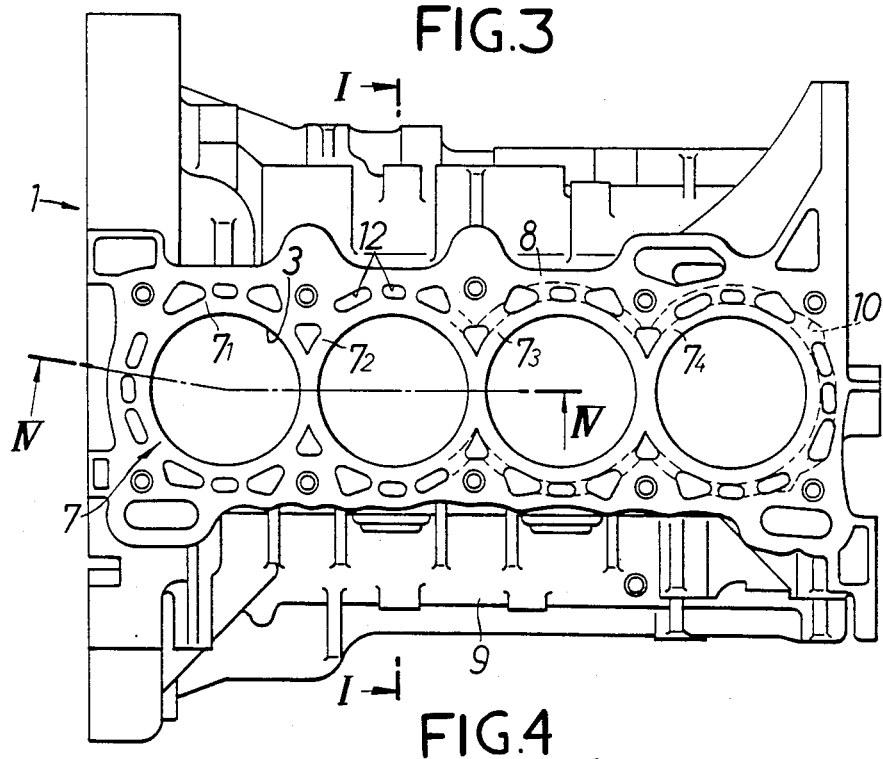
FIG. 3 is a plan view of the cylinder block.
Figure 4:
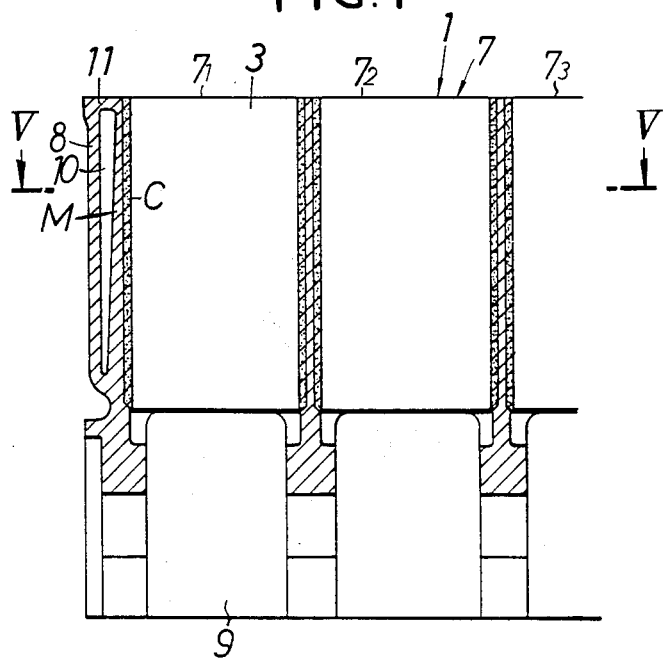
FIG. 4 is a sectional view taken along a line IV—IV in FIG. 3.
Figure 5:
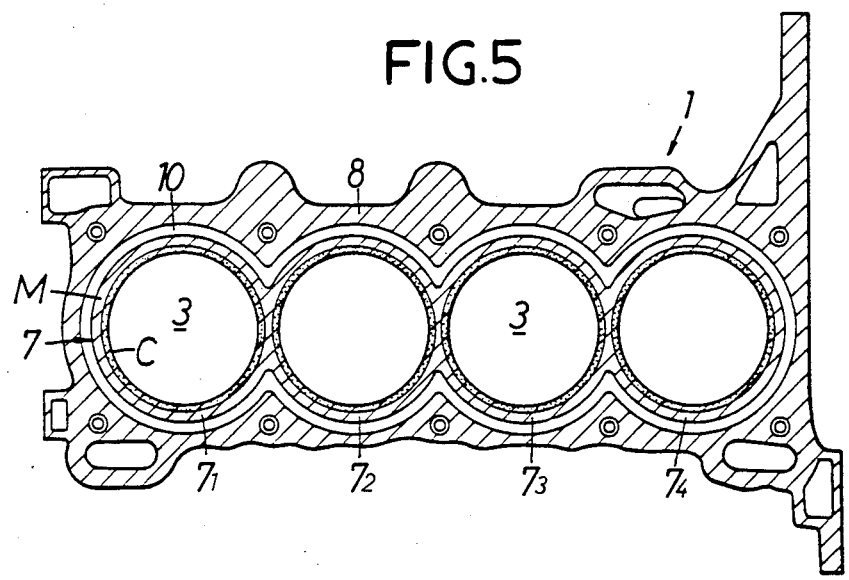
FIG. 5 is a sectional view taken along a line V—V in FIG. 4.

FIG. 1 shows an interanl combustion engine E which comprises a siamese type cylinder block 1 cast from an aluminum alloy which is a light alloy, a cylinder head 2 mounted on the cylinder block 1, a piston 4 slidably received in a cylinder bore 3 in the cylinder block 1, first and second compression rings $6_1$ and $6_2$ mounted in first and second compression ring grooves $5_1$ and $5_2$ in the piston 4 and an oil ring $6_3$ mounted in an oil ring groove $5_3$ in the piston 4. The first and second compressing rings $6_1$ and $6_2$ and the oil ring comprise a piston ring assembly.

Referring to FIGS. 1 to 5, the cylinder block 1 includes siamese type cylinder barrels 7 comprised of a plurality of cylinder barrel portions, such as $7_1$ to $7_4$ for a four cylinder engine, connected together and each having a cylinder bore 3, an outer cylinder block wall 8 surrounding the siamese type cylinder barrel 7, and a crank case 9 connected to the outer cylinder block wall 8. A water jacket 10, is formed between the siamese type cylinder barrel 7 and the outer cylinder block wall 8. At the upper end of the water jacket 10 close to the adjoining surface of the cylinder head, the siamese type cylinder barrel 7 and the outer cylinder block wall 8 are partially interconnected by a plurality of reinforcing deck portions 11. The open portions between the adjacent reinforcing deck portions function as coolant communication ports 12 into the cylinder head. Thus, the cylinder block 1 is constructed as a so-called closed deck type.

Figure 6:
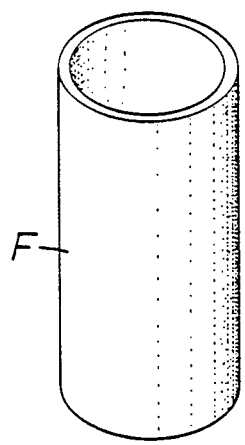
FIG. 6 is a perspective view of a fiber molding.

Each of the cylinder barrel portions $7_1$ to $7_4$ comprises a cylindrical fiber-reinforced portion C which fiber-reinforces the cylinder bore wall 3 or a peripheral portion of the wall 3, and a cylindrical portion made of an aluminum alloy along surrounding an outer periphery of the cylindrical fiber-reinforced portion. The fiber-reinforced portion C is comprised of a cylindrical fiber molding F (FIG. 6) formed of a mixture of an alumina-based fiber and a carbon fiber as reinforcing fibers and an aluminum alloy matrix filled in the fiber molding F.

In the fiber molding F, a ratio of average length of the carbon fiber to that of the alumina-based fiber is in a range of 0.5 to 2.0, preferably in a range of 0.5 to 1.5, and an average aspect ratio of the carbon fiber l/d, wherein l is a length of the fiber and d is a diameter of the fiber) is in a range of 10 to 100.

The use of the carbon fiber together with the alumina-based fiber is effective in providing an improvement in the sliding characteristic of the fiber-reinforced portion C, because of the lubricating ability of the carbon fiber. In this case, it should be noted that both types of the fibers are uniformly dispersed into the light alloy matrix. To this end, a ratio of average lengths of both the fibers is set in a range of 0.5 to 1.5 and preferably at 1. Making all of the fibers of a uniform diameter is effective for providing a fiber molding with both types of the fibers mixed uniformly. To this end, the preferred range of maximum fiber diameter to minimum fiber diameter 10 or less.

Further, to prevent the reduction in strength of material when the carbon fiber is used jointly, the average aspect ratio is preferably set in a range of 10 to 100, as described above. In this case, if the average aspect ratio is less than 10, a strength of interface bond between the light alloy matrix and the carbon fiber is smaller, and this not only causes acceleration of wearing due to falling-off of the carbon fiber from the light alloy matrix but also fails to provide reinforcing strength. On the other hand, if the average aspect ratio exceeds 100, the carbon fiber cannot be dispersed uniformly, and not only does this result in a great cutout effect to bring about a reduction in strength.

When carbon fiber is used, the more the percent of graphitization thereof is present, the more the lubricating ability is improved and the more the Young's modulus is increased. However, during casting there are the disadvantages of not only reducing the wetting characteristics to the light alloy matrix but also the % elongation is decreased, and the carbon fiber is liable to be broken in the compounding process, resulting in a reduction in strength of the fiber-reinforced portion C. Further, a lower strength article of pitch-type carbon fibers is inferior in interface strength and fails to provide a fiber-reinforced portion C having the required strength.

Thus, the most desirable carbon fibers are of a Young's modulus of 20 to 30 t/mm$^2$, and the use of such carbon fibers makes it possible to provide a fiber-reinforced portion C having the required strength.

The most desirable carbon fibers are also of an average diameter of 6 to 8 $\mu$m and of an average length of 100 to 200 $\mu$m. In this case it is preferred that the content of a carbon fiber having a length of 20 $\mu$m or less may be set at 15% or less by weight, and that of a carbon fiber having a length of 300 $\mu$m or more is set at 9% or less by weight.

Alumina-based fibers that may be used include alumina fibers, alumina-silica fibers, etc., because they provide improvements in strength of the fiber-reinforced portion, scratch hardness, seizure and wear resistances, and the like. Some of such alumina-based fibers are, for example, Saffil commercially available from ICI, Fiber FP commercially available from E. I. du Pont de Nemours & Co. and the like.

Fiber volume fraction (Vf) or percentage by volume of the alumina-based fiber is set in a range of 8 to 20% while that (Vf) of the carbon fiber is set in a range of 0.3 to 15%.

If fiber volume fraction of the carbon fiber is set as defined above, the sliding characteristics can be improved.

Figure 7:
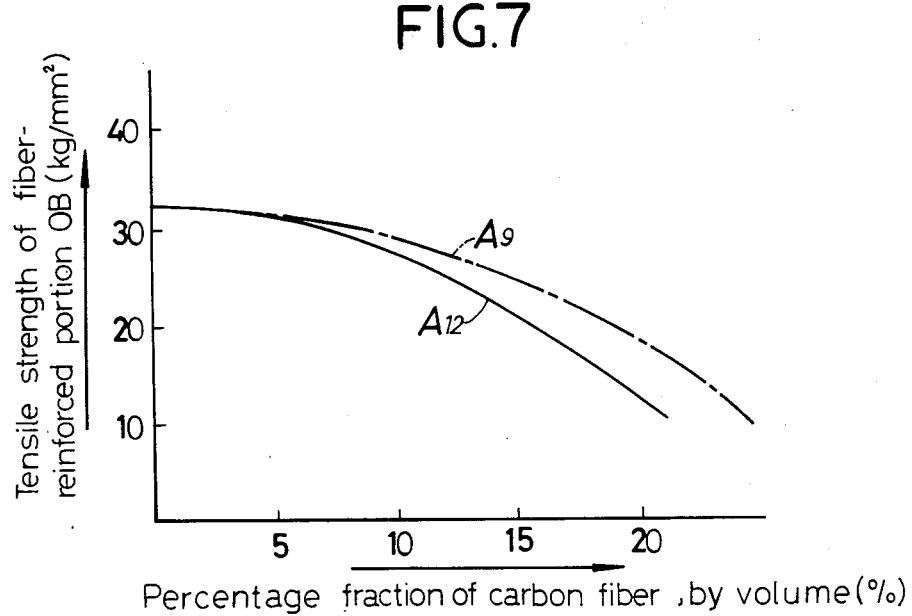
FIG. 7 is a graph illustrating the relationship between the percentage of a carbon fiber, by volume, and tensile strength of a fiber-reinforced portion.

However, if the fiber volume fraction of the carbon fiber is less than 0.3%, the aforesaid effect based on the lubricating ability of the carbon fiber cannot be provided. On the other hand, if fiber volume fraction of the carbon fiber exceeds 15%, the total fiber volume fraction is increased in relation to the alumina-based fiber, and the use of a mixture of these fibers to provide a fiber molding leads to a degraded shape retention of the resulting fiber molding F and to a reduced tensile strength of the resulting fiber-reinforced portion C, as shown in FIG. 7.

In this figure, a line $A_{12}$ indicates a variation in tensile strength where the fiber volume percentage of the alumina-based fiber is set at 12%, and a line $A_9$ indicates a variation in tensile strength where fiber volume percentage of the alumina-based fiber is set at 9%.

It is to be noted that the carbon fiber has a lubricating ability and hence, even if it falls off the light alloy matrix, the scratch characteristic or the like cannot be damaged.

EXAMPLE 1

There were prepared an alumina fiber having an alpha rate (% by weight of α-alumina based on the whole alumina) of 33% and several carbon fibers (having an average diameter of 7 μm) each having a different average aspect ratio and Young's modulus.

Fiber moldings were molded using different carbon fibers in such a manner as to provide a fiber volume fraction of 12% for the alumina fiber and a fiber volume fraction of 9% for the carbon fiber.

The individual fiber moldings and an aluminum alloy (JIS ADC12) were employed to produce a plurality of composite members each corresponding to a fiber-reinforced portion C in a pressure casting process. Casting conditions used were a preheating temperature for the fiber molding of 200° C.; a pouring temperature of 730° C.; and a pouring pressure of 200 to 300 kg/cm$^2$.

The resulting composite member was cut into a test piece, and a tensile test therefor was conducted to examine the effect on the tensile strength of the composite member by the average aspect ratio and the Young's modulus of the carbon fiber. The results are shown in FIGS. 8 and 9.

Figure 10:
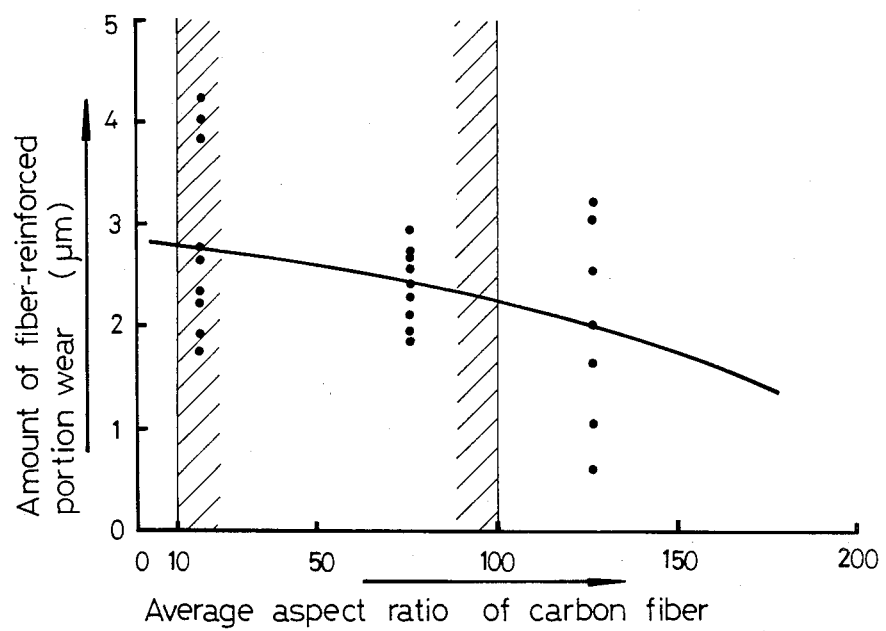
FIG. 10 is a graph illustrating the relationship between average aspect ratio of the carbon fiber and amount of fiber-reinforced portion wear of the first example of FIGS. 8 and 9.

In addition, the composite member was cut into a test piece, and a tip-on-disk type sliding test where the test piece is pressed onto a rotating plate was conducted to examine the effect on the amount wear of the composite member by the average aspect ratio. The results are shown in FIG. 10.

Testing conditions were such that the rotational speed of the disk was of 2.5 m/sec.; the test piece pressing force was of 20 kg/cm$^2$; the sliding distance was of 9,000 m; and the amount of lubricating oil supplied was of 2 to 3 ml/min.

Figure 8:
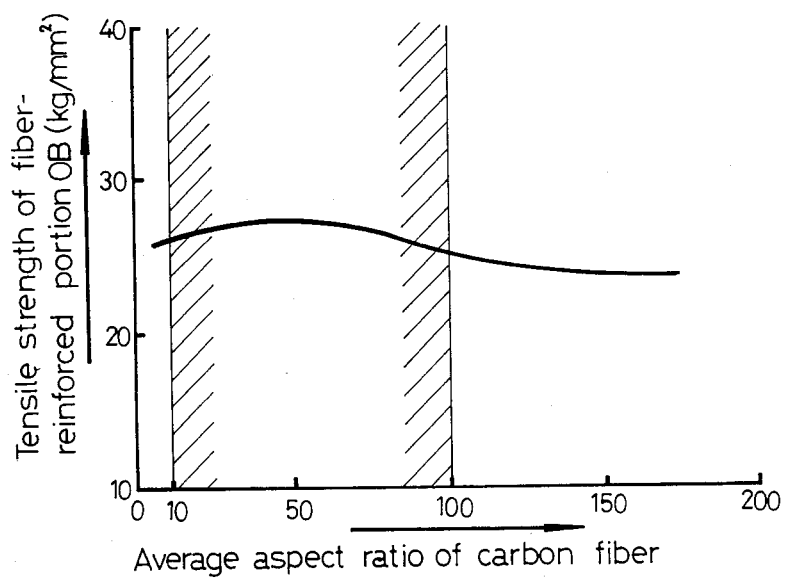
FIG. 8 is a graph illustrating the relationship between average aspect ratio of the carbon fiber and tensile strength of the fiber-reinforced portion of a first example.
Figure 9:
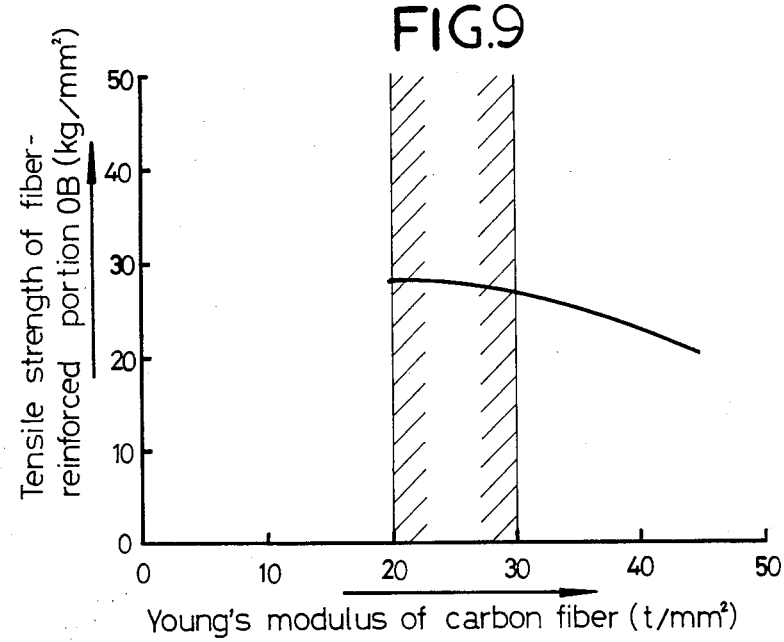
FIG. 9 is a graph illustrating the relationship between Young's modulus of the carbon fiber and tensile strength of the fiber-reinforced portion of the first example of FIG. 8.

As apparent from FIG. 8, if the average aspect ratio is either too small or too large, the tensile strength of the composite member decreases and therefore, the average aspect ratio preferably is in the range of 10 to 100.

Also, as apparent from FIG. 9, the use of the carbon fiber having a larger Young's modulus and an increased graphitization causes a decrease in tensile strength of the composite member and therefore, a suitable range for Young's modulus is of 20 to 30 t/mm$^2$.

It can be seen from FIG. 10 that as the average aspect ratio of the carbon fiber increases, the amount of composite member wear tends to decrease.

EXAMPLE II

In general, an aluminum alloy having a hypereutectic structure normally is employed for the above-described aluminum alloy.

However, the aluminum alloy having a hypereutectic structure contains a primary crystal Si having a large platy structure and an eutectic crystal (α+Si) and hence, the use of such aluminum alloy causes a problem that although there is an improvement in strength of the resulting fiber-reinforced portion, the portion made of the aluminum alloy alone is increased in hardness thereby resulting in a decreased machinability.

The aluminum alloy used in this Example II is a hypereutectic structure aluminum alloy containing only 1.65 to 14.0% by weight of Si.

Figure 11:
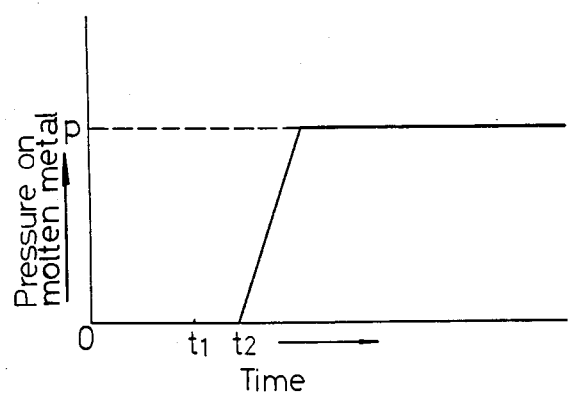
FIG. 11 is a graph illustrating a relationship between the time required for a casting operation and the pressing force on the molten metal.

A cylinder block as described above was fabricated using the steps of producing a cylindrical fiber molding F having fiber volume fractions (Vf) of 12% and 9% respectively for an alumina-based fiber and a carbon fiber, preheating the casting mold to 200° to 300° C., preheating the fiber molding F to 100° to 400° C. to place it into the mold, pouring the molten aluminum alloy metal into the mold within a time t shown in FIG. 11, leaving the molten metal to stand in a poured state for a time t shown in FIG. 11, e.g., for 2 to 10 seconds, and applying a pressure p of 10 to 300 kg/cm$^2$ to the molten metal to force it into the fiber molding F. Thereafter, the resulting cylinder block 1 was subjected to a thermal treatment such as T6 treatment, as required.

When the molten metal was left to stand for a predetermined period of time prior to pressurization thereof as described above, α primary crystal containing a small amount of Si was precipitated in a simple-material portion M during such predetermined time. When the molten metal was then pressurized, the molten metal having a relatively increased Si content was forced into the fiber molding F. Therefore, the amount (% by weight) of the initial crystal Si increases in the fiber-reinforced portion C, and a ratio R of the amount of primary crystals Si in both portions C and M was controlled in a range of $1 < R < 4$ (preferably, 1.2 to 2.0).

Figure 12:
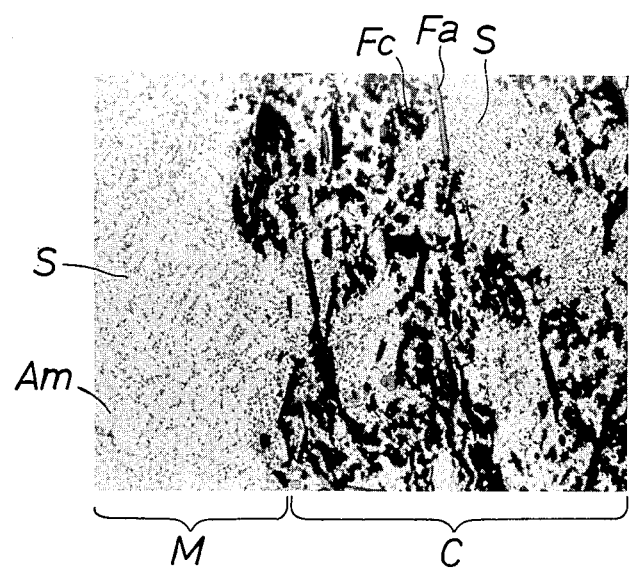
FIG. 12 is a microphotograph showing the metallographic structure of the fiber-reinforced portion and the single light alloy portion.

FIG. 12 is a microphotograph (200 times) showing metallographic structures of the fiber-reinforced portion C and the simple-material portion M, wherein Fa indicates the alumina-based fiber; Fc indicates the carbon fiber; S indicates the primary crystal Si; and Am indicates the aluminum alloy matrix.

As apparent from FIG. 12, the amount of the primary crystal Si is larger in the fiber-reinforced portion C, and the content there of is 12% by weight in the fiber-reinforced portion C, excluding the alumina-based fiber and the carbon fiber. On the other hand, the amount of the primary crystal Si is smaller in the simple-material portion M, and the content thereof is 8.5% by weight in the simple-material portion M. Accordingly, the ratio R of the amounts of the primary crystals in those portions equals 1.4 to 1.

As described above, since the amount of the primary crystal Si is larger in the fiber-reinforced portion C the strength of the latter is increased and the sliding characteristic is also improved. On the other hand, since the amount of the primary crystal Si is smaller in the simple-material portion M, the hardness of the latter is reduced, leading to a satisfactory cutting workability.

It should be noted that if the ratio of the amounts of the primary crystals in the both portions is less than 1, an improvement in strength of the fiber-reinforced portion C cannot be achieved satisfactorily when an aluminum alloy having a lower Si content is employed. On the other hand, if such ratio exceeds 4, a decrease in strength of the simple-material portion M is caused when an aluminum alloy having a lower Si content is employed. In addition, when an aluminum alloy having a higher Si content is employed, controlling of such ratio to exceed 4 results in a decrease in temperature of the molten metal during casting, thereby degrading the fillability of the aluminum alloy in the fiber-reinforced portion C.

The average particle size of the primary crystal Si in the fiber-reinforced portion C is set at a level less than the average diameter of the alumina-based fiber. Such control is accomplished by merely adjusting the temperature of preheating the fiber-reinforced portion to adjust the rate and time of solidification of the molten metal in the fiber molding F and in its surroundings.

If the average particle size of the primary crystal Si is specified, the primary crystal Si can be small, thereby providing an improvement in strength of the fiber-reinforced portion and extremely inhibiting the wearing off of the primary crystal Si for an improvement in sliding characteristic. If the average particle size of the primary crystal Si exceeds the aforesaid average diameter, the amount of primary crystal Si wearing off is increased and thus, the loss of primary crystal Si accelerates wearing of the mating piston 4 and piston rings $6_1$ to $6_3$.

To adjust the amounts of the primary crystals Si in both portions C and M in the above-described casting process, a hypoeutectic structure aluminum alloy containing 1.65 to 14.0% by weight of Si is preferred, as described above. If the Si content is less than 1.65% by weight, it is impossible to anticipate an improvement in strength of the primary crystal in the fiber-reinforced portion. On the other hand, if the Si content exceeds 14.0% by weight, there is shown a tendency to produce a simple-material portion M having a hypereutectic composition, such that a bulky primary crystal Si is liable to be crystallized. This causes a decrease in strength and a degradation in cutting workability of the simple-material portion.

Because unfiberized particulates i.e., shots are necessarily contained in an alumina-based fiber in the production thereof, the strength, sliding characteristic and the like of the resulting fiber-reinforced portion C are governed by particle sizes and content of the shots.

The present inventors have made various studies and consequently, have resolved the effect exerted on the strength of the fiber-reinforced portion C by not only shots having an average particle size of 150 μm or more but also shots having an average particle size of less than 150 μm, and the relationship between average particle size of shots and average fiber diameter that exerts an effect on the strength.

Figure 13:
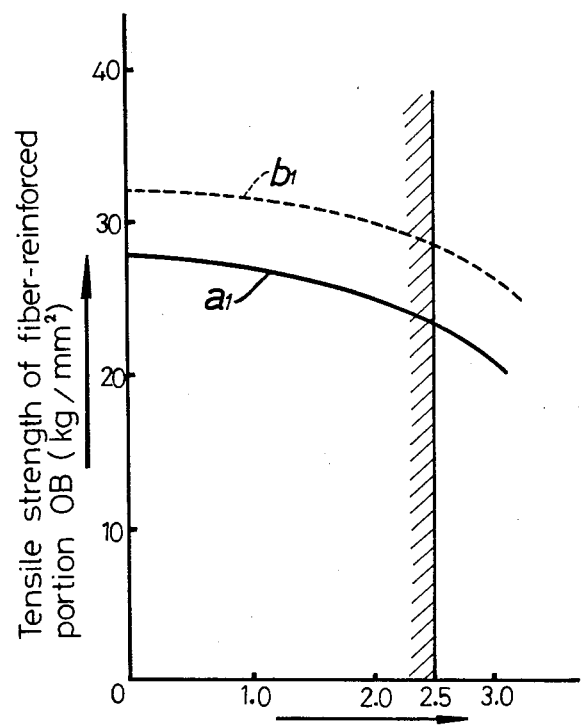
FIG. 13 is a graph illustrating the relationship between the content of shots having particle sizes of 150 $\mu$m or more and tensile strength of the fiber-reinforced portion.
Figure 14:
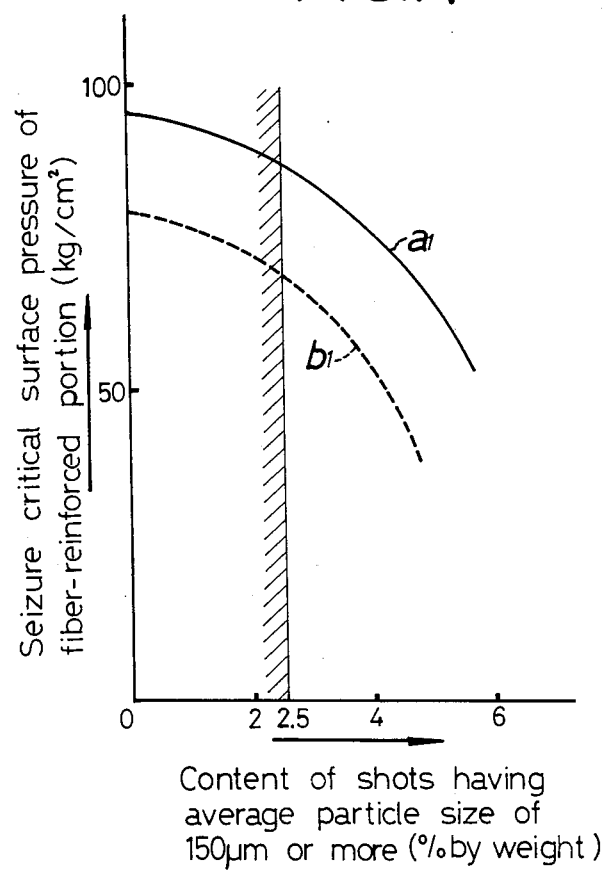
FIG. 14 is a graph illustrating a relationship between content of shots having particle sizes of 150 $\mu$m or more and seizure critical surface pressure of the fiber-reinforced portion.

FIG. 13 illustrates a relationship between content of shots having an average particle size of 150 μm or more and tensile strength of a test piece corresponding to the fiber-reinforced portion C, and FIG. 14 illustrates a relationship between the amount of the above shots and surface pressure at a seizure limit on a test piece corresponding to the fiber-reinforced portion C. In these Figures, a line $a_1$ indicates such relationship where use is made of a mixture of an alumina-based fiber having a fiber volume fraction of 12% and a carbon fiber having a fiber volume fraction of 9%, and a line $b_1$ indicates such relationship where only an alumina-based fiber having a fiber volume fraction of 12% is used. In the alumina-based fiber, the content of silica is 4% by weight, and the alpha rate of alumina is 30 to 40%.

As is apparent from FIGS. 13 and 14, if the content of the shots is of 2.5% or less by weight, it is possible to provide a fiber-reinforced portion C having sufficient strength and sliding characteristic.

Figure 15A:
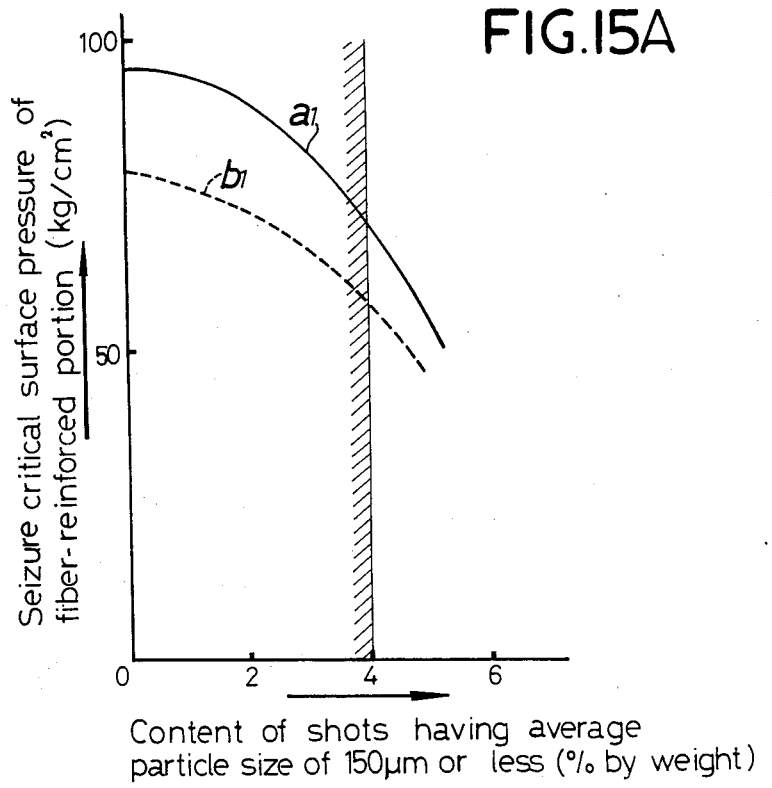
FIG. 15A is a graph illustrating the relationship between content of shots having particle sizes of less than 150 $\mu$m and seizure critical surface pressure of the fiber-reinforced portion.

FIG. 15A illustrates a seizure critical characteristic, under a lubrication-free condition, of a test piece which corresponds to a fiber-reinforced portion C and in which an average particle of shots is set at 150 μm or less in an alumina-based fiber having an average diameter of 3.0 μm. In FIG. 15A, a line $a_1$ indicates such seizure critical characteristic where there is a mixture of fibers having the same fiber volume fractions as described above is used, and a line $b_1$ indicates such seizure critical characteristic where there is only an alumina-based fiber having the same fiber volume fractions as described above. As indicated by the lines $a_1$ and $b_1$, if the content of the shots having an average particle size of 150 μm or less is less than 4.0% by weight based on the alumina-based fiber (containing the shots), the surface pressure at the seizure limit is higher and hence, the resulting fiber-reinforced portion C has a satisfactory utility for constituting a section around the cylinder bore 3. It is apparent that the seizure critical characteristic indicated by the line $a_1$ is increased with the combined use of the carbon fibers having a lubricating ability as compared with that indicated by the line $b_1$ without carbon fibers. In addition, with respect to the relationship between the average particle size of the shots and the average diameter of the alumina-based fiber, the shots having an average particle size 50 times the average diameter of the alumina-based fiber exert an influence on the strength of the fiber-reinforced portion C depending upon their content.

Figure 15B:
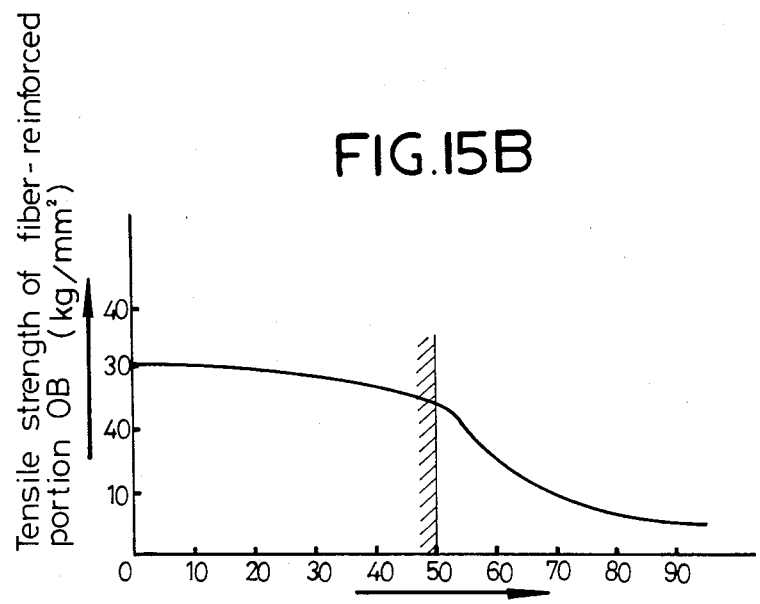
FIG. 15B is a graph illustrating the relationship between a comparison of the average particle sizes of shots to the average diameter of the alumina-based fiber and the tensile strength of the fiber-reinforced portion.

FIG. 15B illustrates the relationship between a comparison of the average particle size of the shots to an average diameter (3 μm) of the alumina-based fiber and the tensile strength of a test piece corresponding to the fiber-reinforced portion C, when use is made of the mixture of fibers having the same volume fractions as described above. It is aparent from FIG. 15B that if the particle size of the shots increases to a level above 50 times the average diameter of the alumina-based fiber, the tensile strength of the test piece is rapidly reduced. Even in this case, the same sliding characteristic and strength as described above can be provided by setting the content of the shots at 4.0% by weight or less.

Figure 16:
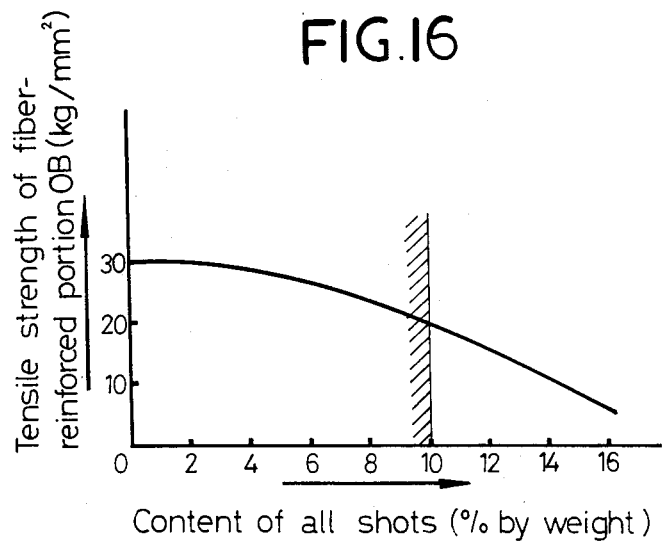
FIG. 16 is a graph illustrating the relationship between entire content of the shots and tensile strength of the fiber-reinforced portion.

FIG. 16 illustrates the relationship of the content of all the shots contained in the alumina-based fiber and the tensile strength of the test piece corresponding to the fiber-reinforced portion C, when use in made of the mixture of fibers having the same fiber volume fractions as described above. It is apparent from FIG. 16 that if the content of all the shots exceeds 10.0% by weight based on the alumina-based fiber (containing shots), the tensile strength of the fiber-reinforced portion C is rapidly reduced. Therefore, the content of all the shots is preferable to be of 10.0% or less by weight.

Silica is contained in an alumina-based fiber, such as an alumina fiber, an alumina-silica or the like, because fiberization thereof is facilitated. In this case, if the content of silica is too large, wettability between the alumina-based fiber and the aluminum alloy is degraded to prevent an improvement in the strength of the fiber-reinforced portion C. On the other hand, if the content of silica is too small, the beneficial effects provided by silica cannot be achieved. Additionally, if the alpha rate of alumina is too high, the alumina-based fiber is more fragile due to its increased hardness. If such fiber is employed to produce a fiber molding F, the latter is deteriorated in shape retention and further, is increased in scratch hardness which accelerates wearing of the mating member. Moreover there is a tendency to increase the amount of alumina-based fiber that falls off the aluminum alloy matrix, and the loss of fibers likewise accelerates wearing of the mating member. On the other hand, if the alpha rate is too low, the wear resistance is deteriorated.

Accordingly, to achieve a satisfactory fiber-reinforcement of the fiber-reinforced portion C, it is necessary to specify the ranges of content and alpha rate of silica.

From such viewpoints, the content of silica is set at 2% or more to 25% or less by weight, preferably 2 to 5% by weight, and the alpha rate of alumina is set at 2% or more to 60% or less by weight, preferably 45% or less by weight.

Figure 17:
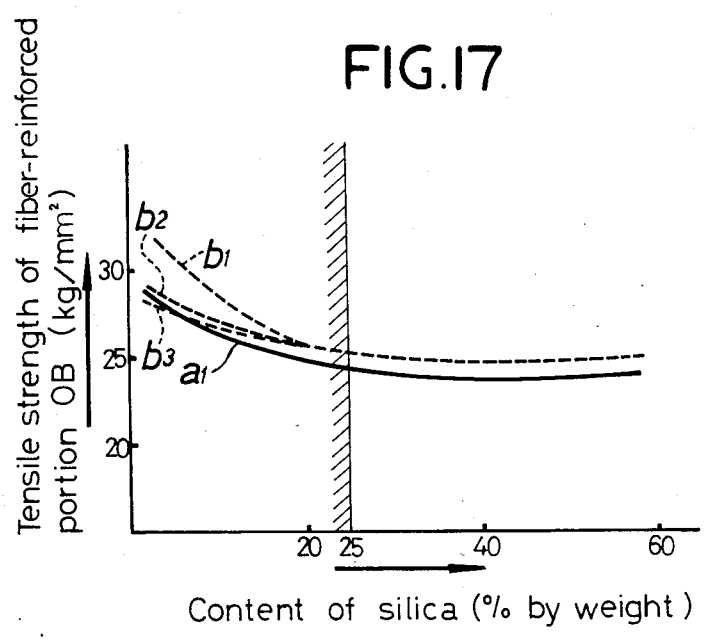
FIG. 17 is a graph illustrating the relationship between content of silica and tensile strength of the fiber-reinforced portion.

FIG. 17 illustrates the relationship between the content of silica in a test piece corresponding to the fiber-reinforced portion C and the tensile strength. In this Figure, the line $a_1$ indicates such relationship where the mixture of fibers having the same fiber volume fractions as described above is used, and lines $b_1$ to $b_3$ indicates such relationship where only the alumina-based fiber having the same fiber volume fraction as described above is used. In the line $a_1$, the alpha rate of alumina is of 50%, and in the lines $b_1$, $b_2$ and $b_3$, the corresponding alpha rates are of 5%, 50% and 85%, respectively.

Figure 18:
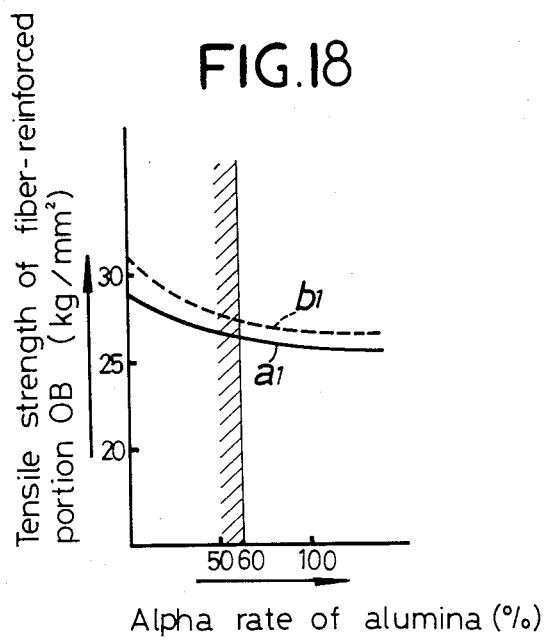
FIG. 18 is a graph illustrating the relationship between alpha rate of alumina and tensile strength of the fiber-reinforced portion.

FIG. 18 illustrates the relationship between the alpha rate of alumina in a test piece corresponding to the fiber-reinforced portion C with a silica content of 5% by weight and the tensile strength. In this Figure, the line $a_1$ indicates such relationship where the mixture of fibers having the same fiber volume fractions as described above is used, and the line $b_1$ indicates such relationship where only the alumina-based fiber having the same fiber volume fraction as described above is used. As apparent from FIG. 18, if the alpha rate of alumina is of 60% or less by weight, it is possible to provide a fiber-reinforced portion C having sufficient strength.

The strength of the fiber-reinforced portion can be improved 8 to 20% with a fiber volume fraction of the alumina-based fiber of 12%, as compared with that in the prior art, by specifying the silica content and the alpha rate of alumina as described above.

Figure 19:
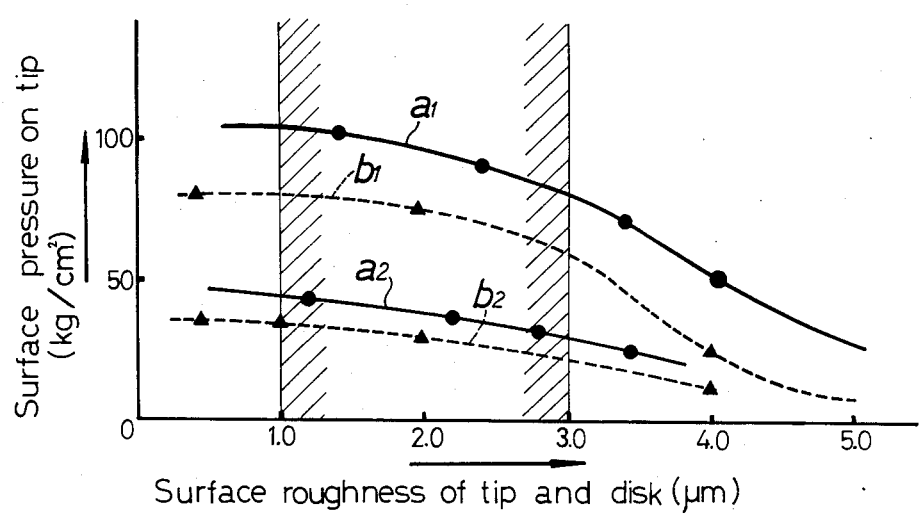
FIG. 19 is a graph illustrating the relationship between surface roughnesses of a tip and a disk and surface pressure acting on the tip.

FIG. 19 illustrates the results of a tip-on-disk sliding test for a fiber-reinforced aluminum alloy using an alumina-based fiber having various diameters and spherical graphite cast iron (JIS FCD75) as a mating member. In this Figure, the line $a_1$ indicates seizure critical characteristic where use is made of a mixture of an alumina-based fiber having a fiber volume fraction of 12% and a carbon fiber having a fiber volume fraction of 9%, and the line $a_2$ indicates scratch critical characteristic where the above fiber mixture is used. In addition, the line $b_1$ indicates seizure critical characteristic where only the alumina based fiber having the same fiber volume fraction as described above is used, and the line $b_2$ indicates scratch critical characteristic where only the alumina-based fiber having the same fiber volume fraction as described above is used.

The aforesaid alloy corresponds to the fiber-reinforced portion and the tip is formed from this alloy. Additionally, the aforesaid cast iron corresponds to the first and second rings $6_1$ and $6_2$ mounted on the piston 4 and the disk is formed from this material. The slide surfaces of the tip and disk are ground so that they have various surface roughnesses of 1.0 μm or more. In this case, the reason why the surface roughnesses are set at 1.0 μm or more is that it is very difficult to provide a surface roughness less than 1.0 μm by grinding in the normal production procedures.

The testing method is to rotate the disk at a velocity of 9.5 m/sec. and press the slide surface of the tip onto the slide surface of the disk with a predetermined force under a lubrication-free condition. This test determines the relationship between the surface roughness of each tip and the surface pressure acting on the tip at a seizure limit and a scratch limit.

As apparent from FIG. 19, if the surface roughness is in a range of 1.0 to 3.0 μm, the surface pressures respectively at the scratch and seizure limits are higher, and adequate sliding characteristics can be provided.

In the test of sliding movement between the tip made of such a fiber-reinforced aluminum alloy and the disk made of such a cast iron, scratch and seizure phenomena are accelerated by the alumina-based fiber falling off the aluminum alloy matrix in the tip during the sliding test. Therefore, it is necessary to firmly retain the alumina-based fiber in the matrix. To satisfy this, the surface roughness of the tip preferably should be set at a level equal to or below one half the average diameter of the alumina-based fiber. By so doing, the alumina-based fiber dispersed in the slide surface of the tip with its axis arranged substantially parallel to that slide surface is retained in the matrix with approximately one half thereof being buried in the matrix, and this inhibits falling-off of the alumina-based fiber. On the other hand, the alumina-based fiber dispersed with its axis arranged substantially perpendicular to the aforesaid slide surface is buried in a larger amount and hence, has only slight relationship to the surface roughness.

With the above aspects in view, if the average diameter of the alumina-based fiber is set in a range of 2.0 to 6.0 μm, then the surface roughness of the tip is set in a range of 1.0 to 3.0 μm. To provide the best sliding characteristic, the average diameter of the alumina-based fiber may be set in a range of 2.0 to 4.0 μm and correspondingly, the surface roughness of the slide surface is set.

Figure 20:
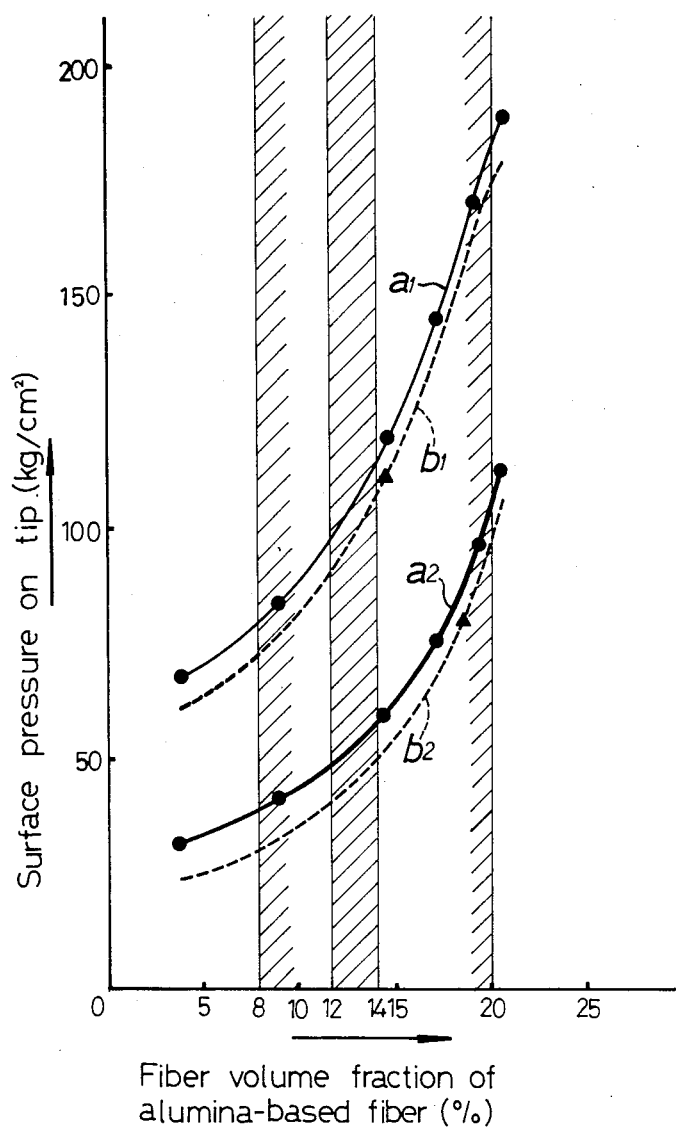
FIG. 20 is a graph illustrating the relationship between fiber volume fraction of the alumina-based fiber and surface pressure acting on the tip.

FIG. 20 illustrates the results of a tip-on-disk sliding test for fiber-reinforced aluminum alloys with various different fiber volume fractions of an alumina-based fiber having an average diameter of 3 μm and spherical graphite cast iron (JIS FCD75) as a mating member. In this Figure, the line $a_1$ indicates the seizure critical characteristic where use is made of a mixture of the alumina-based fiber and a carbon fiber having a fiber volume fraction of 9%, and the line $a_2$ indicates the scratch critical characteristics where the same fiber mixture is used.

In addition, a line $b_1$ indicates the seizure critical characteristic where only the alumina-based fiber is used, and a line $b_2$ indicates the scratch critical characteristic where only the alumina-based fiber is used.

The aforesaid alloy corresponds to the fiber-reinforced portion C, and the tip is formed from this alloy.

Additionally, the aforesaid cast iron corresponds to the above-described first and second compression rings $6_1$ and $6_2$, and the disk is formed from this cast iron. The respective surface roughnesses of the tip and the disk are set at 1 μm.

The testing method is to rotate the disk at a velocity of 9.5 m/sec. and press the slide surface of the tip onto the slide surface of the disk with a predetermined force under a lubrication-free condition. This test determines the relationship between the fiber volume fraction of the alumina-based fiber in the tip and surface pressures acting on the tip at a seizure limit and at a scratch limit.

As apparent from FIG. 20, if the fiber volume fraction of the alumina-based fiber is set in a range of 8.0 to 20.0%, the resultant surface pressures at the scratch and seizure limits are higher. Moreover, the tip is satisfactorily fiber-reinforced and has an excellent wear resistance and further, the amount of mating member wear can be reduced. However, if the fiber volume fraction is less than 8.0%, the fiber-reinforcing ability is smaller, and the wear and seizure resistances are reduced. On the other hand, if the fiber volume fraction exceeds 20.0%, the fillability of the aluminum alloy which is a matrix is degraded, resulting in a failure to assure a satisfactory fiber-reinforcement. In addition, the hardness of the slide portion is increased, resulting in an increase in the mating member wear and moreover, the thermal conductivity is also reduced.

It is apparent that a hybrid type tip made using the above-described fiber mixture is improved in seizures critical characteristic and scratch critical characteristic, as compared with a tip made using the alumina-based fiber alone.

Figure 21:
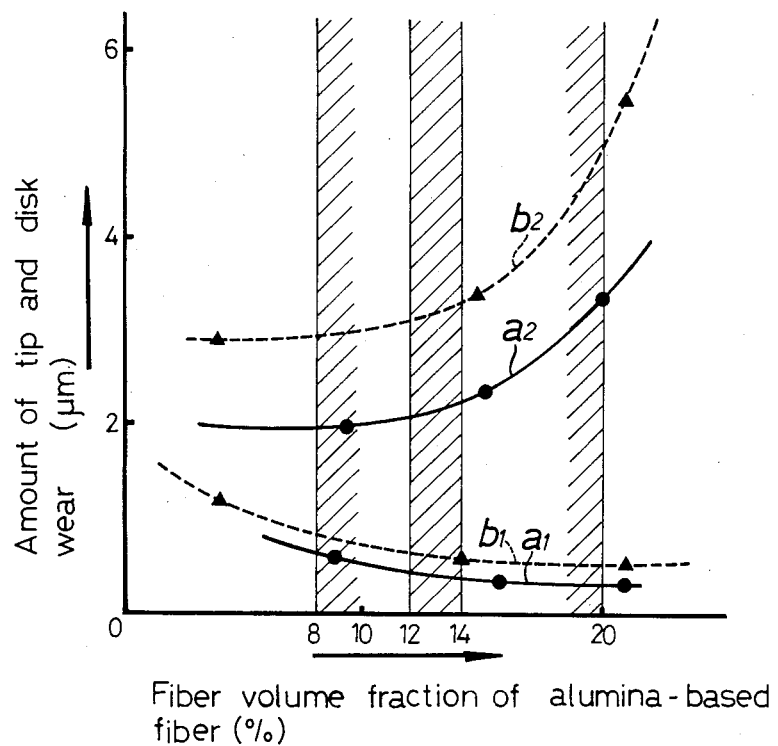
FIG. 21 is a graph illustrating the relationship between fiber volume fraction of the alumina-based fiber and amounts of tip and disk wear.

FIG. 21 illustrates the results of a tip-on-disk type wear test for fiber-reinforced aluminum alloys with various different fiber volume fractions of an alumina-based fiber having an average diameter of 3 μm and a spherical graphite cast iron (JIS FCD75) as the mating member. In this Figure, the line $a_1$ indicates the amount of such alloy wear when use is made of a mixture of the alumina-based fiber and a carbon fiber having a fiber volume fraction of 9%, and the line $a_2$ indicates the amount of mating cast iron wear.

In addition, the line $b_1$ indicates the amount of such alloy wear when only the alumina-based fiber is used, and the line $b_2$ indicates the amount of mating cast iron wear.

The aforesaid alloy corresponds to the fiber-reinforced portion C, and the tip is formed from this alloy. Also, the aforesaid cast iron corresponds to the above-described first and second compression rings $6_1$ and $6_2$, and the disk is formed from this cast iron. The respective surface roughness of the tip and the disk are set at 1 μm.

The testing method is to rotate the disk at a velocity of 2.5 m/sec. and press the slide surface of the tip onto the slide surface of the disk with a pressing force of 20 kg under a lubricated condition and to maintain this state until a sliding distance reaches 2,000 m. The amount of lubricant is of 2 to 3 ml/min.

As apparent from FIG. 21, if the fiber volume fraction of the alumina-based fiber is set in a range of 8.0 to 20.0%, the amount of tip and disk wear are reduced. To reduce the amount of tip and disk to the utmost, it is desirable that the surface roughness of the tip and the disk are set at 1 μm or less and the fiber volume fraction of the alumina-based fiber is set in a range of 12.0 to 14.0%. The average aspect ratio of the alumina-based fiber is set in a range of 20 to 150. By doing so, it is possible to provide a good shape retention for the resulting fiber molding F having a fiber volume fraction as defined above and to improve the strength of the resulting fiber-reinforced portion C. However, if the average aspect ratio is less than 20, moldability for the fiber molding F is deteriorated under a relatively low molding pressure, when the fiber volume fraction is set as low as 8%. On the other hand, if the average aspect ratio exceeds 150, a cut loss of the alumina-based fiber, when the fiber volume fraction is set as high as 20%, is produced to result in a reduced shape retention, because of necessity for a relatively high molding pressure.

Figure 22:
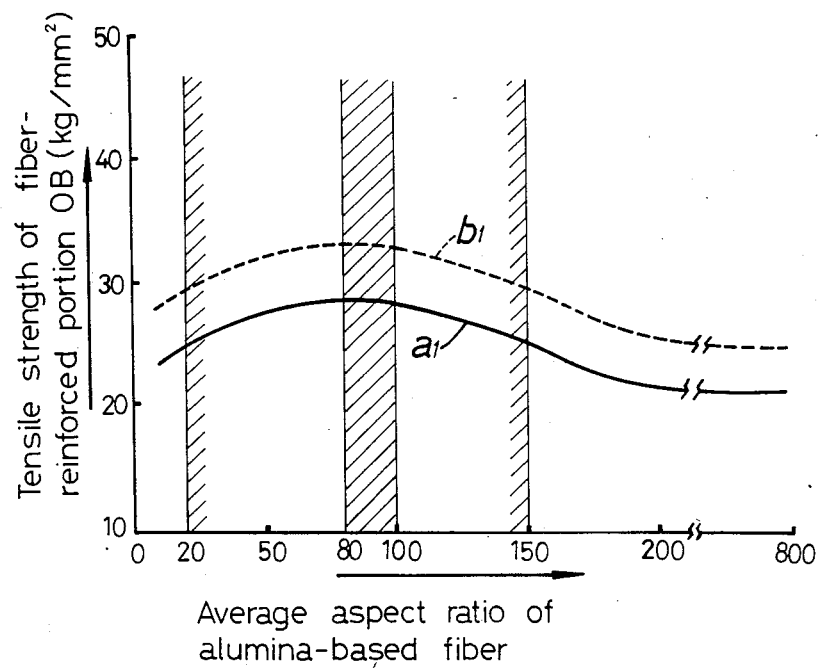
FIG. 22 is a graph illustrating the relationship between average aspect ratio of the alumina-based fiber and tensile strength of the fiber-reinforced portion.

FIG. 22 illustrates the relationship between the average aspect ratio of an alumina-based fiber and the tensile strength of a test piece corresponding to the fiber-reinforced portion C. In this Figure, the line $a_1$ indicates such relationship where use is made of a mixture of an alumina-based fiber having a fiber volume fraction of 12% and a carbon fiber having a fiber volume fraction of 9%, and the line $b_1$ indicates such relationship where there is only an alumina-based fiber having a fiber volume fraction of 12%. As apparent from FIG. 22, if the fiber volume fraction of the alumina fiber is set at 12%, then the average aspect ratio may be set in a range of 20 to 150, preferably 100 or less, for practical use.

Figure 23:
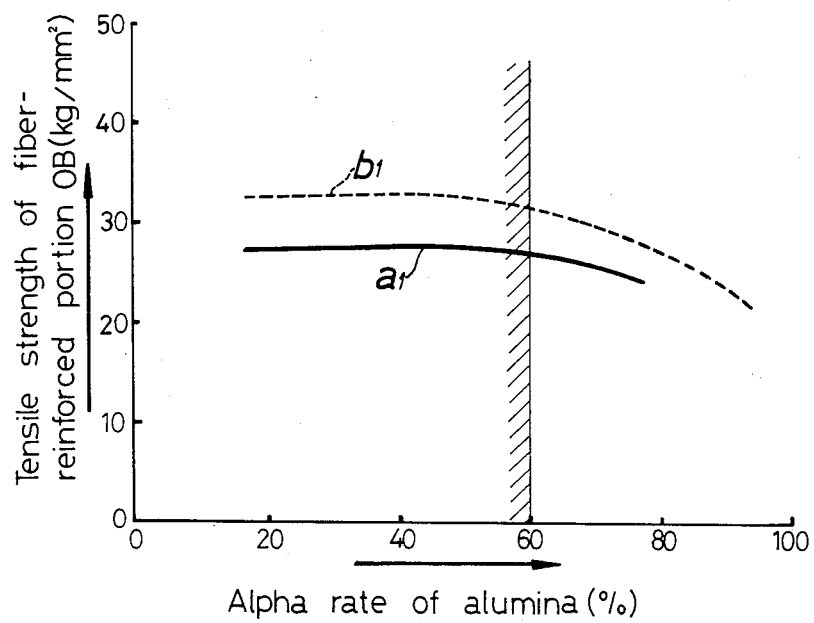
FIG. 23 is a graph illustrating the relationship between alpha rate of alumina and tensile strength of the fiber-reinforced portion.

FIG. 23 illustrates the relationship between the alpha rate of alumina contained in an alumina-based fiber and the tensile strength in a test piece corresponding to the fiber-reinforced portion C. In this Figure, the line $a_1$ indicates such relationship where use is made of a mixture of an alumina-based fiber having a fiber volume fraction of 12%, an average diameter of 3 μm and an average aspect ratio of 70 and a carbon fiber having a fiber volume fraction of 9%, and the line $b_1$ indicates such relationship where use is made of only the aforesaid alumina-based fiber having a fiber volume fraction of 12%. As apparent from FIG. 23, if the alpha rate is of 60% or less, a relatively constant tensile strength is provided, but if the alpha rate exceeds 60%, the tensile strength is rapidly reduced. This is due to a cut loss of such fiber under the influence of a molding pressure, because the hardness of the alumina-based fiber is increased.

The average diameter of the alumina-based fiber is desirable to be of 10 μm or less. The reason is that if the average diameter exceeds 10 μm, such fiber, with its axis arranged to intersect a direction of a tensile load, causes the matrix to become discontinuous and exhibits a large cutout effect.

Figure 24:
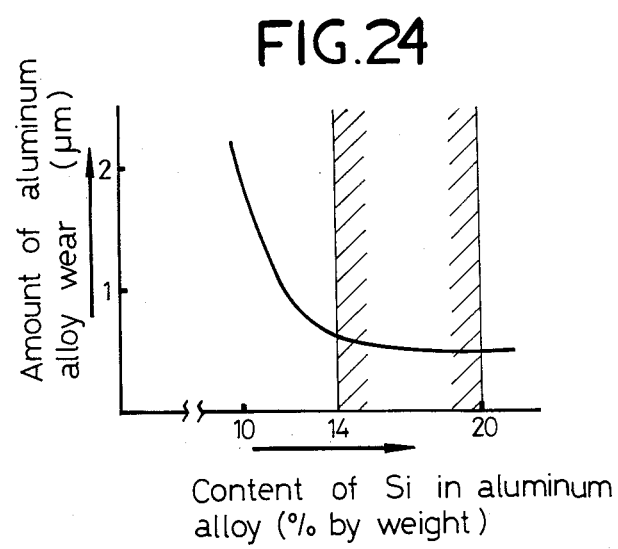
FIG. 24 is a graph illustrating the relationship between Si content of the aluminum alloy and amount of aluminum alloy wear.

In addition to the above described aluminum alloy, an aluminum alloy containing 14 to 20% by weight of Si can be used as the above-described light alloy. This aluminum alloy has an excellent wear resistance in a rang of Si contents defined above, as shown in FIG. 24. However, if the Si content exceeds 20% by weight, casting is impossible. It is noted that magnesium alloys can be also used as a light alloy.

Turning next to a consideration of the characteristics of the piston, when the outer peripheral surface of the piston is sliding directly on the inner peripheral surface of the fiber-reinforced portion in the cylinder block, a problem is encountered that dragging, seizure, etc. may be produced on the outer peripheral surface under an insufficiently lubricated condition, depending upon the type and fiber volume fractions of reinforcing fibers in the fiber-reinforced portion of the cylinder and also due to the lack of protection of the outer peripheral surface of the piston. The present invention contemplates providing a piston most suitable for the above-described fiber-reinforced portion of the cylinder with the fiber volume fraction of the alumina-based fiber being set in a range of 8 to 20% and that of the carbon fiber being set at 15% or less.

The piston in accordance with the present invention has an iron-plated layer on its outer peripheral surface and a tin-plated layer formed on a surface of the iron-plated layer. The iron-plated layer has a hardness set at Hv 250 or more and thickness set in a range of 5 to 30 $\mu$m, and the tin-plated layer has a thickness set in a range of 1 to 10 $\mu$m.

Figure 25:
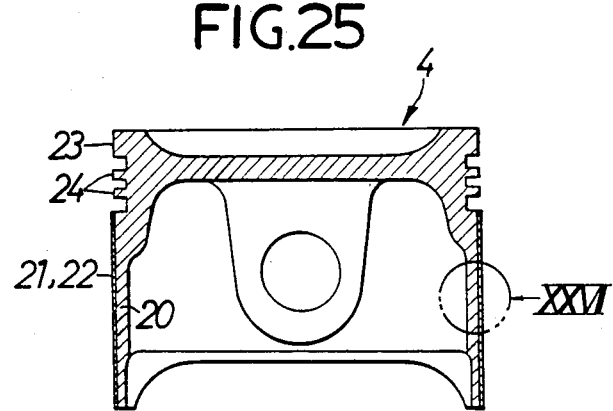
FIG. 25 is a front view in longitudinal section of a piston.
Figure 26:
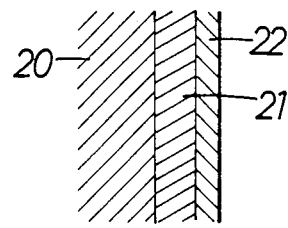
FIG. 26 is an enlarged view of the portion of the piston in the circle XXVI in FIG. 25.

FIGS. 25 and 26 show one embodiment of a piston 4 which is comprised of an aluminum alloy such as JIS AC8H and has an iron-plated layer 21 formed on its outer peripheral surface, e.g., on a skirt 20 in the illustrated embodiment, as clearly shown in FIG. 26, and a tin-plated layer 22 formed on the surface of the iron-plated layer 21. The iron-plated layer 21 is formed in a sulfuric acid bath and preferably has a thickness of 30 $\mu$m and a hardness of Hv 300. The tin-plated layer preferably has a thickness of 1 $\mu$m.

Figures 27A, 27B:
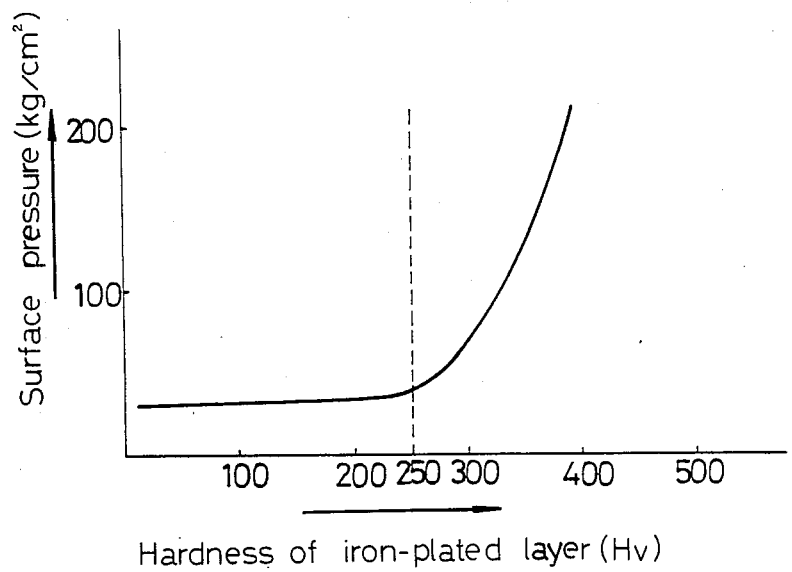
FIG. 27A is a graph illustrating the relationship between hardness of the iron-plated layer and surface pressure thereon.
FIG. 27B is a graph illustrating the results of a tip-on-disk type sliding test.

The hardness of the iron-plated layer is preferably Hv 250 or more from the results of the dragging limit test shown in FIG. 27A. The dragging test is conducted by causing a test piece of the same type as the aforesaid fiber-reinforced portion C with the fiber volume fraction of the alumina-based fiber being set at 12% and that of the carbon fiber being set at 9% and a test piece of the same type as the piston 4 to reciprocally slide in directions opposite to each other under a predetermined surface pressure. The iron-plated layer 21 of the piston 4 has a good conformability to the inner peripheral surface of the fiber-reinforced portion C and hence, conjointly with the lubricating ability of the carbon fiber, disadvantages such as dragging, seizure, etc. of the iron-plated layer 21 will not be produced even under an insufficiently lubricated condition. Thus, it is possible to improve the sliding characteristics of the outer peripheral surface of the skirt 20 and the inner peripheral surface of the cylinder bore 3.

The tin-plated layer 22 has a lubricating ability and hence, has the effect of improving the initial sliding movement of the piston 4 relative to the inner peripheral surface of the cylinder bore 3.

FIG. 27B illustrates the results of a tip-on-disk sliding test. The disks used are a disk $D_1$ made of cast iron and disk D made of a fiber-reinforced aluminum alloy. The disk $D_2$ is comprised of an alumina-based fiber having a fiber volume fraction of 12%, a carbon fiber having a fiber volume fraction of 9%, and an aluminum alloy matrix (JIS ADC12). The tips used are tips $T_1$ and $T_2$ made of an aluminum alloy (JIS AC8H), a tip T made of the same aluminum alloy formed on its surface with an iron-plated layer having a hardness of 400 Hv, and a tip $T_4$ made of the same aluminum alloy formed on its surface with the same iron-plated layer as tip $T_3$ and with a tin-plated layer of 1 $\mu$m thickness. The testing method is to rotate the disk at a velocity of 2.5 m/sec. and press the tip onto the slide surface of the disk with a predetermined pressure under a lubrication-free condition. This test determines surface pressures acting on the tip at a fusion-bonding limit and at a dragging limit.

In FIG. 27B, v1 corresponds to a surface pressure at the generation of fusion bond and v2 corresponds to a surface pressure at the generation of dragging. As apparent from FIG. 27B, in the combination of the fiber-reinforced disk $D_2$ the aluminum alloy tip $T_2$, which was not subjected to a surface treatment, the sliding characteristic is the worst of the four tests, and in the combination of the aforesaid disk $D_2$ with the aluminum alloy tip $T_4$ having the iron-plated layer and the tin-plated layer, the sliding characteristic is the best.

It is to be noted that the iron-plated layer 21 and tin-plated layer 22 may be formed not only on the outer peripheral surface of the skirt 20 but also on the top land portion 23 and the land portions 24 in the ring region. In addition, it can be seen from FIG. 27B that even if only the iron-plated layer 21 is formed, as with tip $T_3$, a relatively good sliding characteristic is exhibited.

Next, the construction of the piston rings and their interaction with the cylinder and piston will be considered in connection with five specific examples.

EXAMPLE I

In general, a piston ring is composed of a martensitic stainless steel (e.g., JIS SUS420J2) for the purpose of improving its durability.

In this case, the thermal expansion coefficient of the aluminum alloy comprising the above-described cylinder block is as high as about $23 \times 10^{-6}/°C.$, while that of JIS SUS420J2 as a martensitic stainless steel is as low as about $11 \times 10^{-6}/°C.$ Consequently, the amount of cylinder bore contraction is greater from a high temperature to a low temperature than the amount of piston ring contraction. For this reason, the contracting action of the cylinder bore on the piston ring is great and the fitting clearance for the piston ring is extremely reduced at low temperatures. In such circumstances, if the engine is started, the temperature of the piston ring increases more rapidly than the cylinder block due to a difference in heat capacity between the cylinder block and the piston ring, whereby the expansion of the piston ring is a greater rate than the cylinder block so that the fitting clearance for the piston ring may be reduced to zero, resulting in the possibility of producing an interference between the piston ring and the inner surface of the cylinder bore. To avoid this, the fitting clearance for the piston ring must be set at a larger level at mounting than desired. With such a construction, however, there is a problem that the fitting clearance for the piston ring is enlarged excessively due to enlargement of the cylinder bore with the expansion of the cylinder block when the engine is at a higher temperature, which causes increases in the amount of gas blow-by and the amount of oil consumed.

Figure 28:
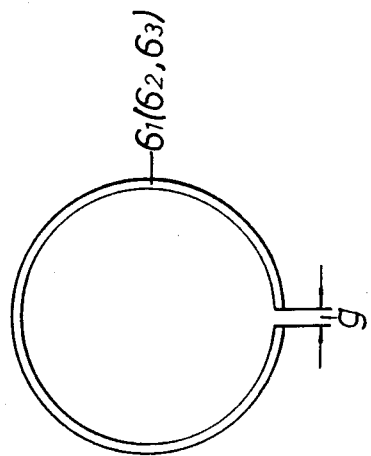
FIG. 28 is a plan view of a piston ring.

Therefore, the present invention contemplates a piston ring composed of an austenitic stainless steel. In this case, the cylinder block 1 is still comprised of an aluminum alloy such as JIS ADC12 having a thermal expansion coefficient of $23 \times 10^{-6}/°C.$ In addition, in the fiber-reinforced portion C, the alumina-based fiber has a fiber volume fraction set at 12%, and the carbon fiber has a fiber volume fraction set at 9%. With such fiber-reinforced portion C, the thermal expansion coefficient of the inner peripheral surface of the cylinder bore 3 is restrained, and the sliding characteristic is improved. The piston rings $6_1$ to $6_3$ shown in FIGS. 1 and 28 are each made of JIS SUS304 as an austenitic stainless steel and have a thermal expansion coefficient of about $18 \times 10^{-6}/°C.$ which is closer to that of the aluminum alloy, i.e., about $23 \times 10^{-6}/°C.$ The piston rings $6_1$ to $6_3$ are mounted in the corresponding ring grooves $5_1$ to $5_3$ and slidably received in the cylinder bore 3 so that a fitting clearance g shown in FIG. 28 may be of 0.25 mm at ambient temperature (25° C.). With such a construction, a predetermined fitting clearance g can be assured at a lower temperature to avoid any interference between the piston rings $6_1$ to $6_3$ and the cylinder bore 3 during starting of the engine, and the enlargement of the fitting clearance g is restrained at higher temperatures of the engine to provide reductions in the amount of gas blow-by and the amount of oil consumed.

This is substantiated by the following consideration. For example, if the diameter of the cylinder bore is of 80 mm, the circumference thereof is 80×3.14=251.2 mm. If the piston ring is slidably received into the cylinder bore with a fitting clearance g set at 0.25 mm at 25° C., the amount of piston ring and cylinder bore contraction at −30° C. are, because the difference in temperature is 55° C., as follows:

The piston ring made of austenitic stainless steel in accordance with the present invention (which will be referred to as an austenitic piston ring hereinafter) will contract:

$$(251.2-0.25)\times 18\times 10^{-6}\times 55=0.25 \text{ mm}.$$

The conventional piston ring made of a martensitic stainless steel (JIS SUS420J2) (which will be referred to as a martensitic piston ring hereinafter) will contract:

$$(251.2-0.25)\times 11\times 10^{-6}\times 55=0.15 \text{ mm}.$$

The cylinder bore in the aluminum alloy cylinder block will contract:

$$251.2\times 23\times 10^{-6}\times 55=0.31 \text{ mm}.$$

Thus, the fitting clearances g at −30° C. for both the piston ring of the present invention and the conventional piston ring, i.e., a difference between the amount of the cylinder bore contraction and the amount of piston ring contraction, are as follows:

For the austenitic piston ring:

$$(251.2-0.31)-[(251.2-0.25)-0.25]=0.19 \text{ mm}.$$

For the martensitic piston ring:

$$(251.2-0.31)-[(251.2-0.25)-0.15]=0.09 \text{ mm}.$$

With respect to the martensitic piston ring, because the fitting clearance g is narrow at a low temperature, there is a risk that interference may be produced between the piston ring and the cylinder bore as a result of the difference in heat capacity between the piston ring and the cylinder wall around the cylinder bore due to the difference in rates of temperature increase, as discussed above. Accordingly, to positively avoid such interference, it is necessary to set the required fitting clearance for the martensitic piston ring at −30° C. at a value substantially equal to that of the austenitic piston ring. As a result, the fitting clearance at 25° C. for the martensitic piston ring becomes 0.35 mm. However, by doing so, when the piston ring and the wall around the cylinder bore reach 150° C., the fitting clearance for the austenitic piston ring is only 0.41 mm, whereas for the martensitic piston ring is 0.72 mm which is approximately 1.7 times the value for the austenitic piston ring. This results in significant increases in the amounts of gas blow-by and of oil consumed for the martensitic piston ring.

EXAMPLE II

When the outer peripheral surface of the piston ring made of an iron-based alloy is allowed to slide directly on the inner peripheral surface of the fiber-reinforced portion in the cylinder block, a problem is encountered of an increase in the amount of wear of the outer peripheral piston ring surface due to the conformability of the piston ring to the fiber-reinforced portion, the extremely hard carbonate falling off the piston ring, and the like under an insufficiently lubricated condition. Accordingly, the present invention contemplates a piston ring having a nitrided layer formed on its outer peripheral surface, with the rate of carbonate area occupying the outer peripheral surface being set at 5% or less.

Figure 29:
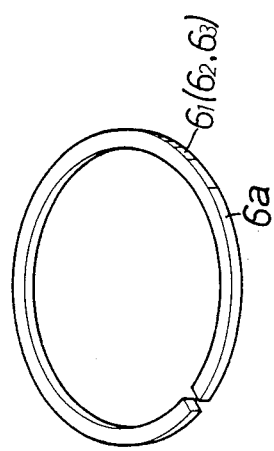
FIG. 29 is a perspective view of the piston ring.

In the embodiment illustrated in FIGS. 1 and 29, the piston rings $6_1$ to $6_3$ are made of an iron-based material such as a partensitic stainless steel of JIS SUS420J2, and a nitrided layer is formed on an outer peripheral surface 7a of each of the piston rings by an $NH_3$ gas nitriding treatment at 550° to 600° C. for 5 hours. The rate of carbonate area occupying each outer peripheral surface 7a is set at 5% or less and specifically in the illustrated embodiment, at 1% or less.

In this case, the cylinder block 1 is made of an aluminum, alloy JIS ADC12, and in the fiber-reinforced portion C around the cylinder bore 3, a fiber volume fraction of an alumina-based fiber is set at 12%, and a fiber volume fraction of a carbon fiber is set at 9%. with such fiber-reinforced portion C, it is possible to achieve a satisfactory reinforcement around the cylinder bore 3 and improve seizure and wear resistances and further provide the lubricating ability of the carbon fiber exposed to the inner peripheral surface of the cylinder bore 3.

Figure 30:
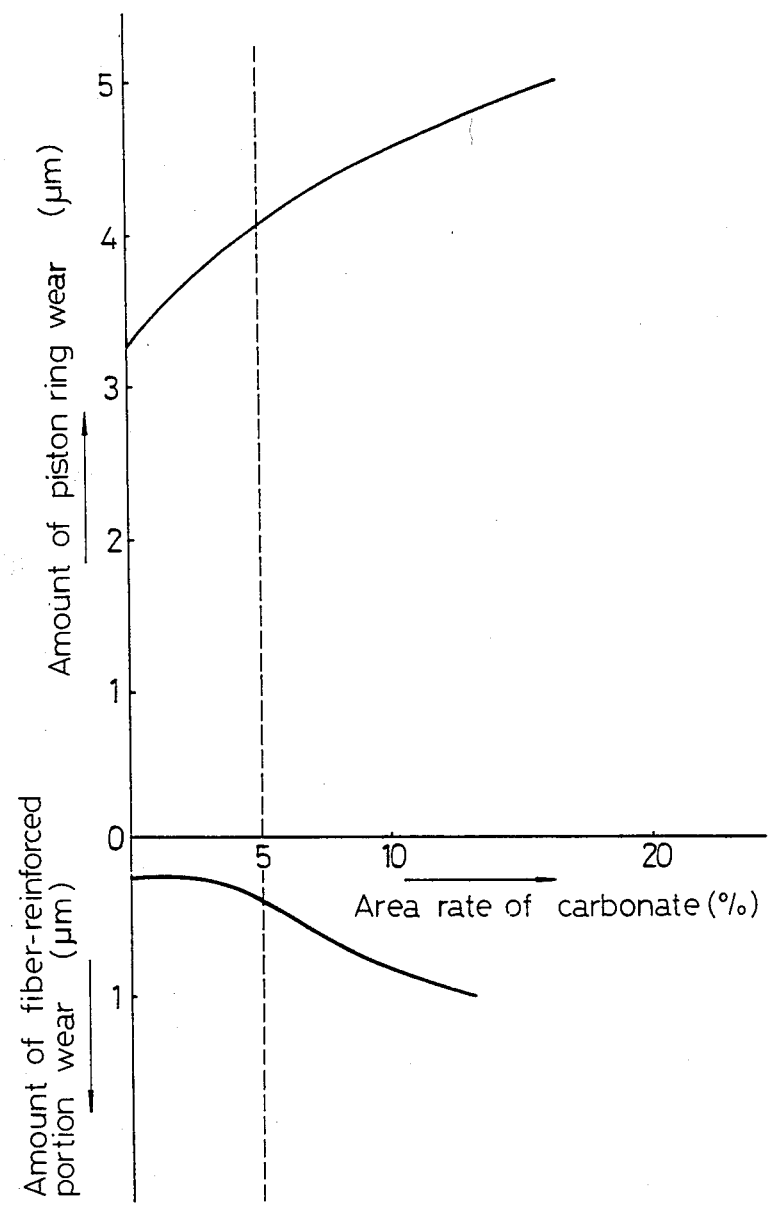
FIG. 30 is a graph illustrating the relationship between carbonate area occupying rate and amounts of fiber-reinforced portion wear and piston ring wear.

FIG. 30 illustrates the results of a wear test for the piston rings $6_1$ to $6_3$ and the fiber-reinforced portion C. As apparent from FIG. 30, if the rate of carbonate area is of 5% or less, the amount of wear of the piston rings $6_1$ to $6_3$ and the fiber-reinforced portion C are of an acceptably small value.

The wear test was conducted by allowing a test piece of the same type as the aforesaid piston rings $6_1$ to $6_3$ to slide over a distance of 40 km on a test piece of the same type as the aforesaid fiber-reinforced portion C.

The outer peripheral surface 6a of each of the piston rings $6_1$ to $6_3$ with the nitrided layer formed thereon in the above manner are satisfactorily conformable to the inner peripheral surface of the cylinder bore 3 of the above-described construction and also have a higher hardness. Moreover, since the rate of carbonate area occupying the outer peripheral surface is set at 5% or less, it is possible conjointly with the lubricating ability of the carbon fiber to reduce the amount of wear of the outer peripheral surface 6a of the piston rings $6_1$ to $6_3$ even with insufficient lubrication.

EXAMPLE III

There is provided a piston ring exhibiting an excellent sliding characteristic relative to a fiber-reinforced portion of a type as described above with the fiber volume fraction of the above-described alumina-based fiber being set in a range of 8 to 20% and the fiber volume fraction of the above-described carbon fiber being set in a range of 0.3 to 15%. In the alumina-based fiber, the content of α-alumina in alumina components is set in a range of 10 to 60% by weight, preferably 45% by weight or less, and the content of shots having a particle size of 150 μm or more is set at 2.5% by weight or less based on the total fiber weight. Further, the content of silica is set at 25% or less by weight, preferably in a range of 2 to 5% by weight.

A guard chromium-plated layer is formed on an outer peripheral surface 6a of each of piston rings 6₁ and 6₃ similar to those shown in FIG. 29 with a thickness set in the range of 10 to 150 μm, preferably 70 to 100 μm, and a hardness set in the range of Hv 600 to 1,000, preferably 700 to 900. If the thickness of the plated layer is less than 10 μm, there is a possibility for the plated layer to wear upon sliding on the fiber-reinforced portion C, leading to an exposure of a piston ring body. On the other hand, if the thickness exceeds 150 μm, the plated layer is liable to crack due to a difference in thermal expansion coefficient between the layer and the piston ring body, and further, the production cost is also increased. In addition, if the hardness of the plated layer is less than Hv 600, the seizure resistance is inferior. On the other hand, if the hardness exceeds Hv 1,000, scratches may be produced in the fiber-reinforced portion C to accelerate falling-off of the fiber and increase the amount of wear of the fiber-reinforced portion C.

The following is a description of a test example. For components around the cylinder bore 3, a test piece A was made of cast iron with phosphorus and vanadium added thereto to have an improved wear resistance and a test piece B was made of an aluminum alloy which was reinforced by an alumina-based fiber having a fiber volume fraction of 12% and a carbon fiber having a fiber volume fraction of 9%. For materials for the piston ring, a steel test piece C was formed on its surface with a hard chromium-plated layer having a thickness of 50 μm and a hardness of Hv 800 to 900 and a steel test piece D was subjected to a nitriding treatment.

Figure 31:
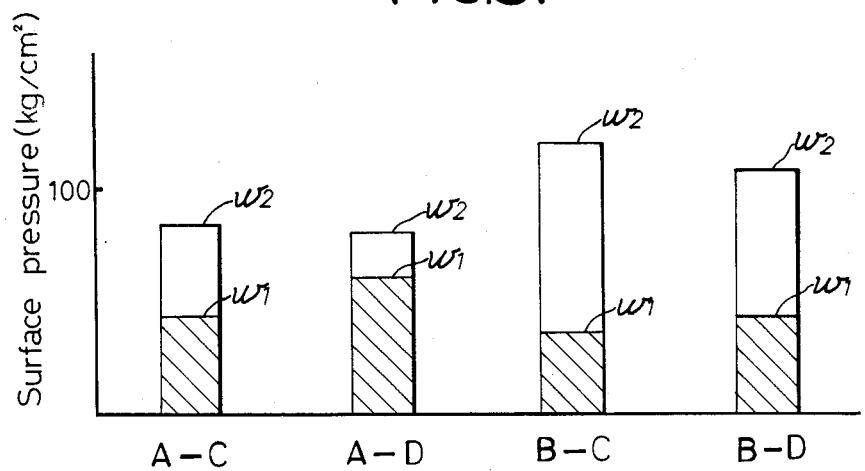
FIG. 31 is a graph illustrating the relationship between a combination of various test pieces and surface pressure.

In the combinations of A and C (Comparative Example), A and D (Comparative Example), B and C (Inventive Example), and B and D (Comparative Example), the test pieces were rotated relative to each other in sliding relationship with varied surface pressures under a lubrication-free condition to determine the surface pressures at the generation of scratches and surface pressures at the generation of seizures. The obtained results are given below in Table 1. FIG. 31 is a graph of these results. In FIG. 31, $w_1$ indicates a surface pressure at the generation of scratches, and $w_2$ indicates a surface pressure at the generation of seizure.

TABLE 1

|  | A-C | A-D | B-C | B-D |
|---|---|---|---|---|
| Surface pressure at the generation of scratches (kg/cm²) | 43 | 60 | 36 | 43 |
| Surface pressure at the generation of seizures (kg/cm²) | 85 | 81 | 120 | 108 |

In the same combination of test pieces as described above, the test pieces were rotated and slid on each other at a relative velocity of 12.5 m/sec. with a surface pressure of 30 kg/cm² and while supplying a lubricating oil at a rate of 2.5 ml/min. to examine the relationship between sliding distance and amount of wear. This provided the results shown in FIG. 32. Table 2 shows these values at a sliding distance of 4,000 m.

TABLE 2

|  | A-C | | A-D | | B-C | | B-D | |
|---|---|---|---|---|---|---|---|---|
|  | A | C | A | D | B | C | B | D |
| Wear amount (μm) | 0.7 | 2.7 | 1.3 | 2.5 | 0.25 | 2.5 | 0.3 | 2.2 |

It can be seen from the above Table 1 and FIG. 31 that the combination in Example B-C of the present invention is slightly inferior in scratch resistance, but significantly superior in seizure resistance, as compared with any other combinations. In addition, it can be seen from the above Table 2 and FIG. 32 that the amount of wear of the fiber-reinforced aluminum alloy test piece B is considerably smaller than that of the cast iron test piece A and that the amount of wear of the test piece B in the combination with the steel test piece C subjected to a hard chromium plating treatment is smallest.

Additionally, it can seen that the wear on test piece C formed with the hard chromium-plated layer and the nitrided test piece C is lower when used with the fiber-reinforced aluminum alloy test piece B as compared with the cast iron test piece A.

EXAMPLE IV

There is provided a piston ring having excellent sliding characteristics relative to a fiber-reinforced portion smaller to that in the above Example III.

As shown in FIGS. 33 and 34, an iron-based metal-plated layer 30 containing hard particles is formed on the entire surface, including the outer peripheral surface, of each of the piston rings 6₁ to 6₃ by utilizing an electrical plating process.

A suitable thickness of the iron-based metal-plated layer 30 is in a range of 5 to 100 μm, and plating metals which may be used are Fe—Co alloy, Fe—Co—P alloy and the like. The iron-based metal-plated layer of this type has a good adhesion property and therefore will not flake off, even on the first compression ring 6₁. In the chemical constituents of the above alloys, Co has the effect of increasing the hardness of the iron-based metal-plated layer 30, and its content is set in a range of 10 to 40% by weight. If the Co content is less than 10% by weight, such effect is not provided. On the other hand, if the Co content exceeds 40% by weight, the plated layer is difficult to form and even though it has been formed, its surface becomes rough. P has an effect similar to that of Co, and its content is set in a range of 2 to 10% by weight. If the P content is less than 2% by weight, such effect is not provided, whereas if the P content exceeds 10% by weight, the plated layer is difficult to form.

The inclusion of the hard particles 31 in the iron-based metal-plated layer 30 is effected by suspending the hard particles 31 in a plating solution and encasing them into the layer 30 during forming thereof. The hard particles may be selected from the group consisting of SiC, BN, $Si_3N_4$, $MoS_2$, WC and $Al_2O_3$. The hard particles 31 have the effect of improving the wear resistance of the iron-based metal-plated layer 30, and the amount of particles dispersed is set in a range of 10 to 30% in terms of area rate. If the dispersed amount is less than 10%, the wear resistance is decreased, whereas if the dispersed amount exceeds 30%, the encasing of the hard particles 31 into the iron-based metal-based metal-plated layer 30 may be ineffective, and there is a risk that the particles will fall off. In addition, a suitable average particle size of the hard particles is in a range of 0.5 to 10 μm. If the average particle size exceeds 10 um, the encasing of the hard particles 31 into the iron-based metal-plated layer 30 may be ineffective, and there is a risk that the particles will fall off. On the other hand, the hard particle having an average size less than 0.5 μm are difficult to produce and have a decreased effect on wear resistance.

For a tip-on-disk type sliding test, a disk and tip as described in the following were prepared. A disk was cast using spherical graphite cast iron (JIS FCD75) for the first compression ring $6_1$ and then formed on its surface with an iron-based metal plated-layer which was made of a Fe—Co—P alloy and contained $Si_3N_4$ having an average particle size of 3 μm as the hard particles. In this case, the content of Co was 25% by weight; the content of P was 6% by weight; and the amount of $Si_3N_4$ dispersed was 25% in terms of area rate. A tip was formed from a mixture of an alumina-based fiber having a fiber volume fraction of 12% (an alpha rate of 33% and a $SiO_2$ content of 2 to 5% by weight), a carbon fiber having a fiber volume fraction of 9%, and an aluminum alloy (JIS ADC12) matrix to correspond to the fiber-reinforced portion C of the cylinder block 1.

To examine seizure characteristic, the disk was rotated at a velocity of 2.5 m/sec. and pressed under a lubrication-free condition with various different pressing forces to determine seizure critical surface pressure. In this way, the results shown in FIG. 35 were provided. The Comparative Example used a disk having a chromium-plated layer formed thereon.

Figure 35:
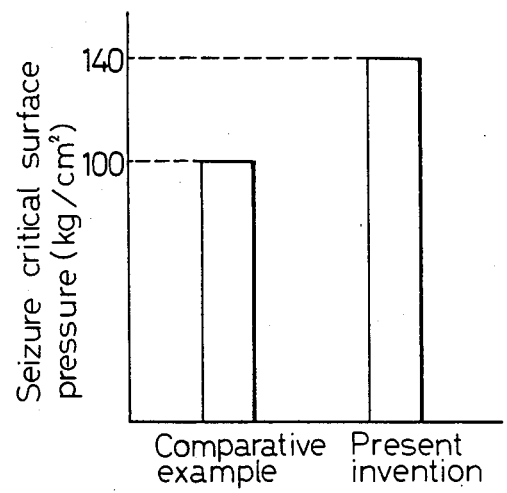
FIG. 35 is a graph illustrating the seizure characteristic.

It is apparent from FIG. 35 that the seizure critical surface pressure in this Example of the present invention was 140 kg/cm$^2$ and substantially improved as compared with 100 kg/cm$^2$ in the Comparative Example. This improvement in seizure critical surface pressure is attributable to Fe—Co—P alloy, rather than the $Si_3N_4$.

Figure 36:
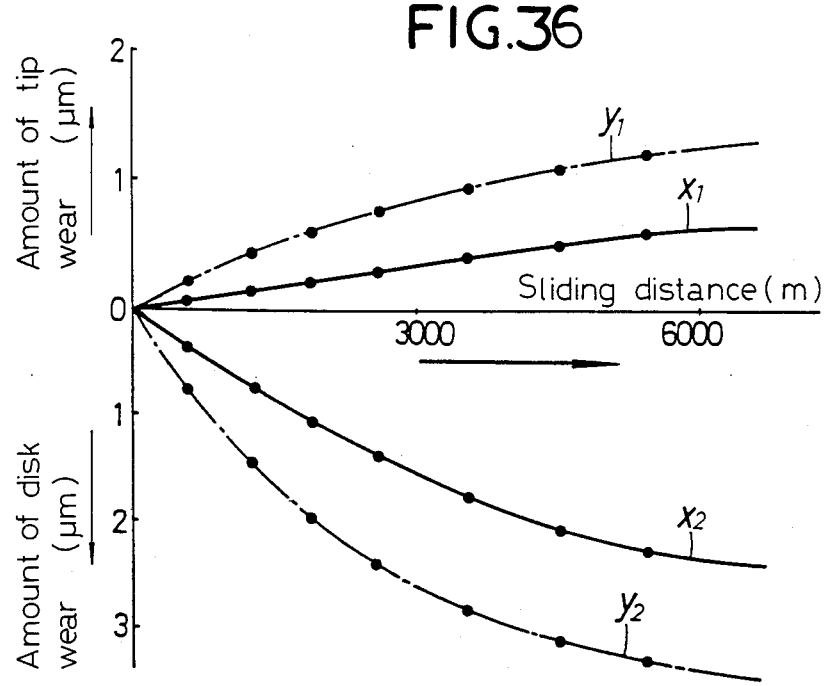
FIG. 36 is a graph illustrating the relationship between sliding distance and amounts of tip and disk wear.

To examine wear characteristic, the disk was rotated at a velocity of 12.5 m/sec. and then, the tip was pressed onto the disk with a pressing force of 30 kg/cm$^2$ under a lubricated condition. The amount of lubricating oil supplied was 2.5 ml/min. In this way, the results shown in FIG. 36 were obtained. In FIG. 36, lines $x_1$ and $x_2$ indicate the results in the present invention, and lines $Y_1$ and $Y_2$ indicate the results in the Comparative Example.

It is apparent from FIG. 36 that the amount of disk and tip wear in the present invention are less than those in the Comparative Example. This improvement in wear resistance is particularly remarkable with the disk. This demonstrates that the first compression ring $6_1$ of the construction has an excellent wear resistance. This improvement in wear resistance is attributable to the cooperation of the Fe—Co—P alloy with $Si_3N_4$.

It is to be noted that a copper or copper alloy-plated layer may be provided on the iron-based member in order to further improve the adhesion property of the iron-base metal-plated layer.

EXAMPLE V

There is provided a piston ring having a construction similar to that in the above-described Example IV.

More specifically, as in the above Example IV, a nickel-based metal-plated layer containing hard particles was formed on the entire surface including the outer peripheral surface of each of the piston rings $6_1$ to $6_3$.

The thickness of the nickel-based metal-plated layer preferably in the range of 5 to 100 μm. Illustrative of such plating metals which may be used are an Ni—Co alloy, an Ni—Co—P alloy or the like. The nickel-based metal-plated layer made of such an alloy has good adhesion properties and therefore will not flake off. The layer also has heat and oxidation resistances and hence, exhibits an excellent durability within an engine which is under a high temperature and oxidative environment. Of the aforesaid chemical constituents, Co has the effect of increasing the hardness of the nickel-based metal-plated layer, and the content of Co is set in a range of 10 to 40% by weight. If the Co content is less than 10 by weight, such effect is not achieved. On the other hand, if the Co content exceeds 40% by weight, the plated layer is difficult to form, and even though it has been formed, its surface is rough. P has the same effect as that of Co, and the content of P is set in a range of 2 to 10% by weight. If the P content is less than 2% by weight, such effect is not provided. On the other hand, if the P content exceeds 10% by weight, the plated layer is difficult to form.

The inclusion of the hard particles in the nickel-based metal-plated layer is accomplished by suspending the hard particles in a plating solution and encasing them in the nickel-based metal-plated layer during the forming thereof. The preferred particles are selected from the group consisting of SiC, BN, $Si_3N_4$, $MoS_2$, WC and $Al_2O_3$. Such hard particles have the effect of improving the wear resistance of the nickel-based metal-plated layer. The amount of particles dispersed is set in a range of 10 to 30% in terms of area rate. If the dispersed amount of particles is less than 10%, the wear resistance of the resulting nickel-based metal-plated layer is lower. On the other hand, if the dispersed amount exceeds 30%, the hard particles are not sufficiently encased in the nickel-based metal-plated layer and may be fall off. A suitable average particle size of the hard particles is in the range of 0.5 to 10 μm. If the average particle size exceeds 10 μm, the hard particles are not sufficiently encased in the nickel-based metal-plated layer and may fall off. On the other hand, hard particles having an average particle size less than 0.5 μm are difficult to produce, and the wear resistance improving effect thereof is reduced.

For a tip-on-disk type sliding test, a tip and disk described in the following were prepared. A disk was cast using a spherical graphite cast iron (JIS FCD75) to correspond to the first compression ring $6_1$ and was then formed on its surface with an nickel-based metal-plated layer which was made of Ni—Co—P alloy and contains $Si_3N_4$ having an average particle size of 3 μm as the hard particles. In this case, the content of Co was 25% by weight; the content of P was 6% by weight; and the amount of $Si_3N_4$ dispersed was 30% in terms of area rate. A tip was formed from a mixture of an alumina-based fiber having a fiber volume fraction of 12% (an alpha rate of 33% and a $SiO_2$ content of 2 to 5% by weight), a carbon fiber having a fiber volume fraction of 9%, and an aluminum alloy (JIS ADC12) matrix to correspond to the fiber-reinforced portion C of the cylinder block 1.

To examine seizure characteristic, the disk was rotated at a velocity of 2.5 m/sec. and pressed under a lubrication-free condition with various different pressing forces to determine seizure critical surface pressure. In this way, the results shown in FIG. 37 were provided. The Comparative Example uses a disk similar to that used in the previous Example IV having a chromium-plated layer formed thereon.

Figure 37:
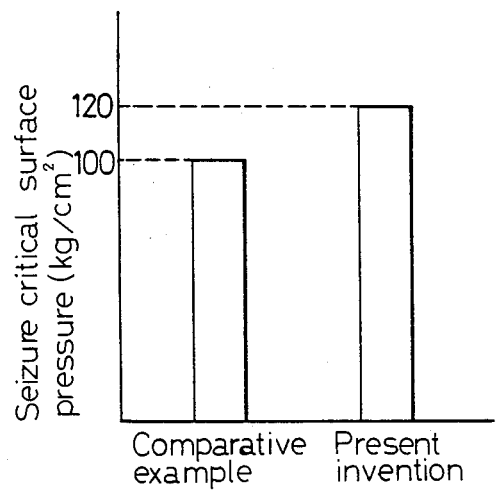
FIG. 37 is a graph illustrating a seizure characteristic.

It is apparent from FIG. 37 that the seizure critical surface pressure in this Example of the present invention is of 120 kg/cm² and improved as compared with 100 kg/cm² in the Comparative Example. This improvement in seizure critical surface pressure is primarily attributable to Ni—Co—P alloy, rather than $Si_3N_4$.

Figure 38:
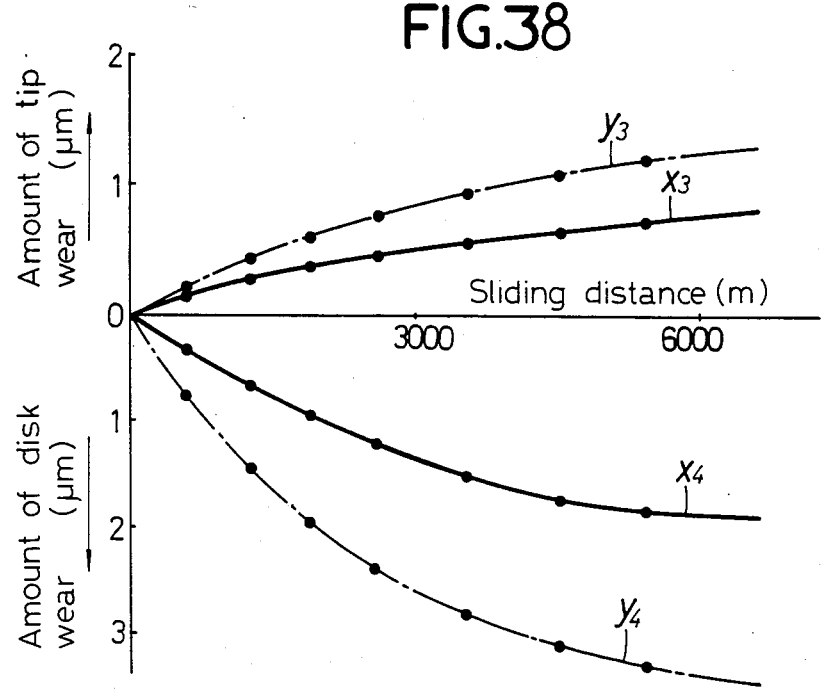
FIG. 38 is a graph illustrating the relationship between sliding distance and amounts of tip and disk wear.

To examine wear characteristic, the disk was rotated at a velocity of 12.5 m/sec. and then, the tip was pressed onto the disk with a pressing force of 30 kg/cm² under a lubricated condition. The amount of lubricating oil supplied was of 2.5 ml/min. This state was maintained until the sliding distance exceeded 6,000 m to determine the amounts of disk and tip wear. In this way, the results shown in FIG. 38 was obtained. In FIG. 38, lines $x_3$ and $x_4$ indicate the results of the present invention, and lines $Y_3$ and $Y_4$ indicate the results of the Comparative Example.

It is apparent from FIG. 38 that the amount of disk and tip wear in the present invention are less than those in the Comparative Example. This improvement in wear resistance is particularly remarkable with the disk. This demonstrates that the first compression ring $6_1$ has excellent wear resistance. This improvement in wear resistance also is attributable to the cooperation of the Ni—Co—P alloy with $Si_3N_4$.

It is to be noted that a copper- or copper alloy-plated layer may be provided on the iron-based member in order to further improve the adhesion property of the nickel-based metal-plated layer.

In summary, although the foregoing description is of preferred embodiments of the cylinder, piston rings of the present invention, it will readily appear to those skilled in the art that various forms of those components can be successfully employed and in various combinations that have not been specifically disclosed without departing from the scope of the present invention as set forth below.

What is claimed is:

1. An internal combustion engine comprising a cylinder block made of a light-alloy and having a wall with a cylinder bore for slidably receiving a piston with a piston ring thereon, comprising, the wall having a cylindrical fiber-reinforced portion formed of a mixture of an alumina-based fiber and a carbon fiber with a light-alloy matrix; said alumina-based fiber having a fiber volume fraction set in a range of 8 to 20%; and said carbon fiber having a fiber volume fraction set in a range of 0.3 to 15%, an average aspect ratio set in a range of 10 to 100, and a Young's modulus set in a range of 20 to 30 t/mm².

2. An internal combustion engine according to claim 1, wherein said alumina-based fiber contains silica of a content of 25% by weight or less, and has an average aspect ratio set in a range of 20 to 150 and an alpha rate set in a range of 2 to 60%.

3. An internal combustion engine according to claim 2, wherein said silica content is set in a range of 2 to 5% by weight; said alumina-based fiber aspect ratio is set at 100 or less; and said alumina-based fiber alpha rate is set at 45% or less.

4. An internal combustion engine according to claim 1, 2 or 3, wherein said alumina-based fiber contains shots of a content set in a range of 10.0% or less by weight of shots, and with the shots having an average particle size of 150 μm or more being set in a range of 2.5% or less by weight, the shots having an average particle size less than 150 μm being set in a range of 4.0% or less by weight, and the shots having an average particle size 50 or more times an average of the alumina-based fiber being set in a range of 4.0% or less by weight based on said alumina-based fiber containing said shots.

5. An internal combustion engine according to claim 1, 2, or 3, wherein an inner peripheral surface of the fiber-reinforced portion has a roughness set at a level equal to or below one half of an average diameter of said alumina-based fiber.

6. An internal combustion engine according to claim 1, 2, or 3, wherein said light-alloy is an aluminum alloy containing 1.65 to 14.0% by weight of Si, with a ratio of the amount of Si primary crystal in the fiber-reinforced portion to the amount of Si primary crystal in the light-alloy in non-fiber-reinforced portion being greater than one and less than or equal to four, and an average particle size of primary crystal Si in the fiber-reinforced portion being set at a level less than an average diameter of said alumina-based fiber.

7. An internal combustion engine according to claim 1, 2, or 3, wherein said light-alloy is an aluminum alloy containing 14 to 20% by weight of Si.

8. An internal combustion engine according to claim 1, 2, or 3, wherein said piston has an iron-plated layer formed on an outer peripheral surface and a tin-plated layer formed on an outer surface of the iron-plated layer, said iron-plated layer having a hardness of Hv 250 or more and a thickness of 5 to 30 μm, and said tin-plated layer having a thickness of 1 to 10 μm.

9. An internal combustion engine according to claim 1, 2, or 3, wherein said piston ring is formed of an austenitic stainless steel.

10. An internal combustion engine according to claim 1, 2, or 3, wherein said piston ring is formed of an iron-based alloy with a nitride layer formed on an outer peripheral surface of the piston ring and having a rate of carbonate area occupying the outer peripheral surface of 5% or less.

11. An internal combustion engine according to claim 1, 2, or 3, wherein said piston ring is formed of an iron-based alloy with a hard chromium-plated layer formed on an outer peripheral surface of said piston ring, said chromium-plated layer having a thickness set in a range of 10 to 150 μm and a hardness set in a range of Hv 600 to 1,000.

12. An internal combustion engine according to claim 11, wherein said hard chromium-plated layer has a thickness set in a range of 70 to 100 μm and a hardness set in a range of Hv 700 to 900.

13. An internal combustion engine according to claim 1, 2, or 3, wherein said piston ring is formed of an iron-based alloy, with an outer peripheral surface of said piston ring being formed with an iron-based metal-plated layer containing hard particles.

14. An internal combustion engine according to claim 13, wherein a plating metal for said iron-based metal-plated layer is a Fe—Co alloy containing 10 to 40% by weight of Co, and said hard particles are selected from a group consisting of SiC, BN, $Si_3N_4$, $MoS_2$, WC, and $Al_2O_3$ and have an average particle size of 0.5 to 10 μm with an amount of hard particles dispersed being in a range of 10 to 30% in terms of area rate.

15. An internal combustion engine according to claim 13, wherein a plating metal for said iron-based metal-plated layer is a Fe—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

16. An internal combustion engine according to claim 1, 2, or 3, wherein said piston ring is formed of an iron-based alloy, with an outer peripheral surface of said piston ring being formed with a nickel-based metal-plated layer containing hard particles.

17. An internal combustion engine according to claim 16, wherein a plating metal for said nickel-based metal-plated layer is a Ni—Co alloy containing 10 to 40% by weight of Co, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

18. An internal combustion engine according to claim 16, wherein a plating metal for said nickel-based metal-plated layer is a Ni—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

19. An internal combustion engine according to claim 4, wherein an inner peripheral surface of the fiber-reinforced portion has a roughness set at a level equal to or below one half of an average diameter of said alumina-based fiber.

20. An internal combustion engine according to claim 4, wherein said light-alloy is an aluminum alloy containing 1.65 to 14.0% by weight of Si, with a ratio of the amount of Si primary crystal in the fiber-reinforced portion to the amount of Si primary crystal in the light-alloy singly containing portion being greater than one and less than or equal to four, and an average particle size of primary crystal Si in the fiber-reinforced portion being set at a level less than an average diameter of said alumina-based fiber.

21. An internal combustion engine according to claim 4, wherein said light-alloy is an aluminum alloy containing 14 to 20% by weight of Si.

22. An internal combustion engine according to claim 4, wherein said piston has an iron-plated layer formed on its outer peripheral surface and a tin-plated layer formed on an outer surface of the iron-plated layer, said iron-plated layer having a hardness of Hv 250 or more and a thickness of 5 to 30 μm, and said tin-plated layer having a thickness of 1 to 10 μm.

23. An internal combustion engine according to claim 4, wherein said piston ring is formed of an austenitic stainless steel.

24. An internal combustion engine according to claim 4, wherein said piston ring is formed of an iron-based alloy with a nitride layer formed on an outer peripheral surface of the piston ring and having a rate of carbonate area occupying the outer peripheral surface of 5% or less.

25. An internal combustion engine according to claim 4, wherein said piston ring is formed of an iron-based alloy with a hard chromium-plated layer formed on an outer peripheral surface of said piston ring, said plated layer having a thickness set in a range of 10 to 150 μm and hardness set in a range of Hv 600 to 1,000.

26. An internal combustion engine according to claim 24, wherein said hard chromium-plated layer has a thickness set in a range of 70 to 100 μm and a hardness set in a range of Hv 700 to 900.

27. An internal combustion engine according to claim 4, wherein said piston ring is formed of an iron-based alloy with an outer peripheral surface of said piston ring being formed with an iron-based metal-plated layer containing hard particles.

28. An internal combustion engine according to claim 26, wherein a plating metal for said iron-based metal-plated layer is a Fe—Co alloy containing 10 to 40% by weight of Co, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

29. An internal combustion engine according to claim 26, wherein a plating metal for said iron-based metal-plated layer is a Fe—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

30. An internal combustion engine according to claim 4, wherein said piston ring is formed of an iron-based alloy, with an outer peripheral surface of said piston ring being formed with a nickel-based metal-plated layer containing hard particles.

31. An internal combustion engine according to claim 29, wherein a plating metal for said nickel-based metal-plated layer is a Ni—Co alloy containing 10 to 40% by weight of Co, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

32. An internal combustion engine according to claim 29, wherein a plating metal for said nickel-based metal-plated layer is a Ni—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

33. An internal combustion engine comprising a cylinder block made of a light-alloy and having a cylinder wall with a cylinder bore for slidably receiving a piston with a piston ring thereon, comprising, the cylinder wall including a cylindrical fiber-reinforced portion formed of a mixture of an alumina-based fiber and a carbon fiber with a light-alloy matrix; said alumina-based fiber having a fiber volume fraction set in a range of 8 to 20%, and said carbon fiber having a fiber volume fraction set in a range of 0.3 to 15%; said alumina-based fiber containing 25% or less by weight of silica and having an average aspect ratio set in a range of 20 to 150; and said alumina-based fiber having an alpha rate set in a range of 2 to 60%.

34. An internal combustion engine according to claim 33, wherein in said alumina-based fiber, said silica content is set in a range of 2 to 5% by weight; said aspect ratio is set at 100 or less; and further said alpha rate is set at 45% or less.

35. An internal combustion engine according to claim 33 or 34, wherein said alumina-based fiber contains shots of a content set in a range of 10.0% or less by weight, and with the shots having an average particle size of 160 μm or more being set in a range of 2.5% or less by weight.

36. An internal combustion engine according to claim 33, wherein said piston has an iron-plated layer formed on an outer peripheral surface and a tin-plated layer formed on an outer surface of the iron-plated layer.

37. A internal combustion engine according to claim 33 or 34, wherein said piston ring is formed of an austenitic stainless steel.

38. An internal combustion engine according to claim 33 or 34, wherein said piston ring is formed of an iron-based alloy with a nitride layer formed on an outer peripheral surface of the piston ring.

39. An internal combustion engine according to claim 33 or 34, wherein said piston ring is formed of an iron-based alloy, with a hard chromium-plated layer formed on an outer peripheral surface of said piston ring.

40. An internal combustion engine according to claim 39, wherein said hard chromium-plated layer has a thickness set in a range of 70 to 100 μm and a hardness set in a range of Hv 700 to 900.

41. An internal combustion engine according to claim 33 or 34, wherein said piston ring is formed of an iron-based alloy with an outer peripheral surface of said piston ring being formed with an iron-based metal-plated layer containing hard particles.

42. An internal combustion engine according to claim 41, wherein a plating metal for said iron-based metal-plated layer is a Fe—Co alloy containing 10 to 40% by weight of Co, and said hard particles are selected from a group consisting of $Si_3N_4$, $MoS_2$, WC and $Al_2O_3$ and have an average particle size of 0.5 to 10 μm with an amount of hard particles dispersed being in a range of 10 to 30% in terms of area rate.

43. An internal combustion engine according to claim 41, wherein a plating metal for said iron-based metal-plated layer is a Fe—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

44. An internal combustion engine according to claim 33 or 34, wherein said piston ring is formed of an iron-based alloy, with an outer peripheral surface of said layer containing hard particles.

45. An internal combustion engine according to claim 44, wherein a plating metal for said nickel-based metal-plated layer is an Ni—Co alloy containing 10 to 40% by weight of Co, and said hard particles are selected from a group consisting of SiC, BN, $Si_3N_4$, $MoS_2$, WC and $Al_2O_3$ and have an average particles size of 0.5 to 10 μm with an amount of hard particles dispersed being in a range of 10 to 30% in terms of area rate.

46. An internal combustion engine according to claim 44, wherein a plating metal for said nickel-based metal-plated layer is an Ni—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

47. An internal combustion engine comprising a cylinder block made of a light-alloy and having a cylinder wall with a cylinder bore for slidably receiving a piston having a piston ring thereon, comprising, the cylinder wall including a cylindrical fiber-reinforced portion formed of a mixture of an alumina-based fiber and a carbon fiber with a light-alloy matrix; said alumina-based fiber has a fiber volume fraction set in a range of 8 to 20%, and said carbon fiber has a fiber volume fraction set in a range of 0.3 to 15%; said piston having an iron-plated layer formed on an outer surface and a tin-plated layer formed on an outer surface of the iron-plated layer.

48. An internal combustion engine according to claim 47, wherein said iron-plated layer has a hardness of Hv 250 or more and a thickness of 5 to 30 μm, and said tin-plated layer has a thickness of 1 to 10 μm.

49. An internal combustion engine according to claim 47, wherein said piston ring is formed of an austenitic stainless steel.

50. An internal combustion engine according to claim 47, wherein said piston ring is formed of an iron-based alloy, with a nitride layer formed on an outer peripheral surface of the piston ring.

51. An internal combustion engine according to claim 47, wherein said piston ring is formed of an iron-based alloy, with a hard chromium-plated layer formed of an outer peripheral surface of said piston ring.

52. An internal combustion engine according to claim 47, wherein said piston ring is formed of an iron-based alloy, with an outer peripheral surface of said piston ring being formed with an iron-based metal-plated layer containing hard particles.

53. An internal combustion engine according to claim 47, wherein said piston ring is formed of an iron-based alloy, with an outer peripheral surface of said piston ring being formed with a nickel-based metal-plated layer containing hard particles.

54. An internal combustion engine comprising a cylinder block made of a light-alloy and having a cylinder wall with a cylinder bore for slidably receiving a piston having a piston ring thereon, comprising, the cylinder wall including a cylindrical fiber-reinforced portion formed of a mixture of an alumina-based fiber and a carbon fiber in a light-alloy matrix; said alumina-based fiber having a fiber volume fraction set in a range of 8 to 20% and said carbon fiber having a fiber volume fraction set in a range of 0.3 to 15%, and the piston ring being formed of an austenitic stainless steel with a thermal coefficient of expansion similar to that of the cylinder wall.

55. An internal combustion engine according to claim 53, wherein said piston has an iron-plated layer formed of an outer peripheral surface and a tin-plated surface formed on an outer surface of the iron-plated layer.

56. An internal combustion engine having first and second members slidable relative to each other, said first member formed of a light-alloy with fiber reinforcing including a mixture of an alimina-based fiber and a carbon fiber, said alumina-based fiber having a fiber volume fraction set in a range of 8 to 20%; and said carbon fiber having a fiber volume fraction set in a range of 0.3 to 15%, an average aspect ratio set in a range of 10 to 100, and a Young's modulus set in a range of 20 to 30 t/mm².

57. An internal combustion engine according to claim 56, wherein said alumina-based fiber contains silica of a content of 25% by weight or less, and has an average aspect ratio set in a range of 20 to 150 and an alpha rate set in a range of 2 to 60%.

58. An internal combustion engine according to claim 57, wherein said silica content is set in a range of 2 to 5% by weight; said alumina-based fiber aspect ratio is set at 100 or less; and said alumina-based fiber alpha rate is set at 45% or less.

59. An internal combustion engine according to claim 56, 57 or 58, wherein said alumina-based fiber contains shots of a content set in a range of 10.0% or less by weight of shots, and with the shots having an average particle size of 150 μm or more being set in a range of 2.5% or less by weight, the shots having an average particle size less than 150 μm being set in a range of 4.0% or less by weight, and the shots having an average particle size 50 or more times an average diameter of the alumina-based fiber being set in a range of 4.0% or less by weight based on said alumina-based fiber containing said shots.

60. An internal combustion engine according to claim 56, 57 or 58 wherein said first member has a sliding surface with said fiber reinforcing and said sliding surface has a roughness set at a level equal to or below one half of an average diameter of said alumina-based fiber.

61. An internal combustion engine according to claim 56, 57 or 58, wherein said light-alloy is an aluminum alloy containing 1.65 to 14.0% by weight of Si, with a ratio of the amount of Si primary crystal in the fiber-reinforced portion to the amount of Si primary crystal in the light-alloy in non-fiber-reinforced portion being greater than one and less than or equal to four, and an average particle size of primary crystal Si in the fiber-reinforced portion being set at a level less than an average diameter of said alumina-based fiber.

62. An internal combustion engine according to claim 56, 57 or 58, wherein said light-alloy is an aluminum alloy containing 14 to 20% by weight of Si.

63. An internal combustion engine according to claim 56, 57 or 58, wherein said second member has an iron-plated layer formed on a sliding surface and a tin-plated layer formed on an outer surface of the iron-plated layer, said iron-plated layer having a hardness of Hv 250 or more and a thickness of 5 to 30 μm, and said tin-plated layer having a thickness of 1 to 10 μm.

64. An internal combustion engine according to claim 56, 57 or 58, wherein said second member has an attachment member mounted thereon in sliding engagement with the first member, and said attachment member is formed of an austenitic stainless steel.

65. An internal combustion engine according to claim 56, 57 or 58, wherein said second member has an attachment member mounted thereon in sliding engagement with the first member and said attachment member is formed of an iron-based alloy with a nitride layer formed on a sliding engagement surface of the attachment member and having a rate of carbonate area occupying the outer peripheral surface of 5% or less.

66. An internal combustion engine according to claim 56, 57, or 58, wherein said second member has an attachment member formed of an iron-based alloy with a hard chromium-plated layer formed on a sliding engagement surface of said attachment member, said chromium-plated layer having a thickness set in a range of 10 to 150 μm and a hardness set in a range of Hv 600 to 1,000.

67. An internal combustion engine according to claim 66, wherein said hard chromium-plated layer has a thickness set in a range of 70 to 100 μm and hardness set in a range of Hv 700 to 900.

68. An internal combustion engine according to claim 56, 67 or 58, wherein said second member has an attachment member formed of an iron-based alloy with a sliding engagement surface of said attachment member being formed with an iron-based metal-plated layer containing hard particles.

69. An internal combustion engine according to claim 68, wherein a plating metal for said iron-based metal-plated layer is a Fe—Co alloy containing 10 to 40% by weight of Co, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

70. An internal combustion engine according to claim 68, wherein a plating metal for said iron-based metal-plated layer is a Fe—Co—P alloy containing 10 to 40% by weight of Co and 2 to 10% by weight of P, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

71. An internal combustion engine according to claim 56, 57, 58, wherein said second member has an attachment member formed of an iron-based alloy with a sliding engagement surface of said attachment member being formed with a nickel-based metal-plated layer containing hard particles.

72. An internal combustion engine according to claim 71, wherein a plating metal for said nickel-based metal-plated layer is a Ni—Co alloy containing 10 to 40% by weight of Co, and said hard particles are selected from a group consisting of SiC, BN, $Si_3N_4$, $MoS_2$, WC and $Al_2O_3$ and have an average particle size of 0.5 to 10 μm with an amount of hard particles dispersed being in a range of 10 to 30% in terms of area rate.

73. An internal combustion engine according to claim 71, wherein a plating metal for said nickel-based metal-plated layer is a Ni—Co—P alloy containing 10 to 40% by weight of Co and 2 to 10% by weight of P, and said hard particles are selected from a group consisting of SiC, BN, $Si_3N_4$, $MoS_2$, WC and $Al_3O_3$ and have an average particle size of 0.5 to 10 μm with an amount of hard particles dispersed being in a range of 10 to 30% in terms of area rate.

74. An internal combustion engine having first and second members slidable relative to each other, said first member being formed of a light-alloy with a fiber-reinforced portion formed of a mixture of an alumina-based fiber and a carbon fiber, said alumina-based fiber having a fiber volume fraction set in a range of 8 to 20%, said carbon fiber having a fiber volume fraction set in a range of 0.3 to 15%; and said alumina-based fiber containing silica of a content of 25% by weight or less, and having an average aspect ratio set in a range of 20 to 150 and alpha rate set in a range of 2 to 60%.

* * * * *